(12) United States Patent
Knottnerus et al.

(10) Patent No.: US 7,938,971 B2
(45) Date of Patent: May 10, 2011

(54) FLUID FILTER APPARATUS AND METHODS

(75) Inventors: Otto Knottnerus, Evansville, WI (US); Larry Langmeier, Stoughton, WI (US); Mark Berger, Janesville, WI (US)

(73) Assignee: Harvard Corporation, Evansville, WI (US)

( * ) Notice: Subject to any disclaimer, the term of this patent is extended or adjusted under 35 U.S.C. 154(b) by 776 days.

(21) Appl. No.: 11/928,836

(22) Filed: Oct. 30, 2007

(65) Prior Publication Data
US 2009/0107926 A1    Apr. 30, 2009

(51) Int. Cl.
*B01D 24/00* (2006.01)
*B01D 63/00* (2006.01)

(52) U.S. Cl. ....... 210/767; 210/90; 210/323.2; 210/634; 210/650; 210/660; 210/321.86; 210/345; 210/458

(58) Field of Classification Search .......... 210/767
See application file for complete search history.

(56) References Cited

U.S. PATENT DOCUMENTS

| | | | |
|---|---|---|---|
| 4,579,657 A * | 4/1986 | Hood, Jr. .................. 210/314 |
| 4,780,204 A | 10/1988 | Rasmussen | |
| 4,792,397 A | 12/1988 | Rasmussen | |
| 5,486,290 A | 1/1996 | McGinness et al. | |
| 5,549,820 A * | 8/1996 | Bober et al. ................. 210/199 |
| 6,270,668 B1 | 8/2001 | Morgan et al. | |
| 6,319,416 B2 | 11/2001 | Morgan et al. | |
| 6,322,697 B1 * | 11/2001 | Hacker et al. ................. 210/248 |
| 2003/0038092 A1 * | 2/2003 | Gershenson ................. 210/767 |
| 2003/0226795 A1 | 6/2003 | Merritt | |
| 2006/0081518 A1 | 4/2006 | Yee et al. | |

OTHER PUBLICATIONS

Como Filtration Systems, Fifter Elements, www.como.biz, 2 pages, Oct. 4, 2007.
Filmax Ultra Fine Filtration, Filtration Elements, www.filmaxinc.com, 2 pages, Oct. 4, 2007.
Search Report and Office Action dated Feb. 5, 2009 of Parallel Great Britain application No. GB0817651.3.
Parallel United Kingdom Application No. GB0817651.3, search and examination report dated Feb. 5, 2009.

* cited by examiner

*Primary Examiner* — Krishnan S Menon
*Assistant Examiner* — Allison Gionta
(74) *Attorney, Agent, or Firm* — Santangelo Law Offices

(57) ABSTRACT

Particular aspects of the inventive technology may, in embodiments, relate to a fluid filter apparatus that includes a filtered fluid conduit that has a length that is at least three times a characteristic diameter; and a plurality of holes, wherein at least one of said holes has a first shape and engages an end cap during fluid filter operation, and wherein at least one other of said holes has said first shape and passes filtered fluid from outside of said filtered fluid conduit to a conduit interior during fluid filter operation.

29 Claims, 23 Drawing Sheets

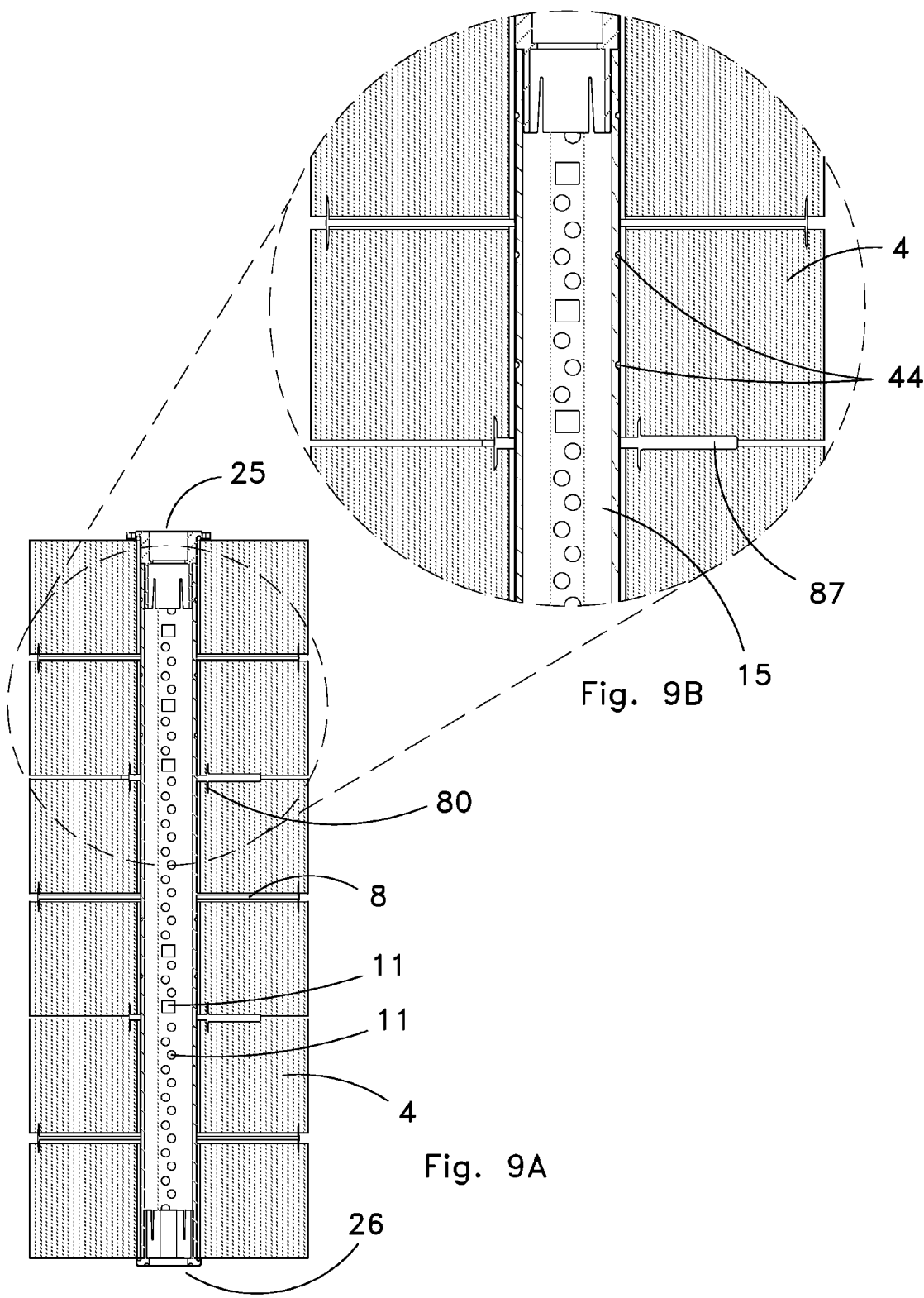

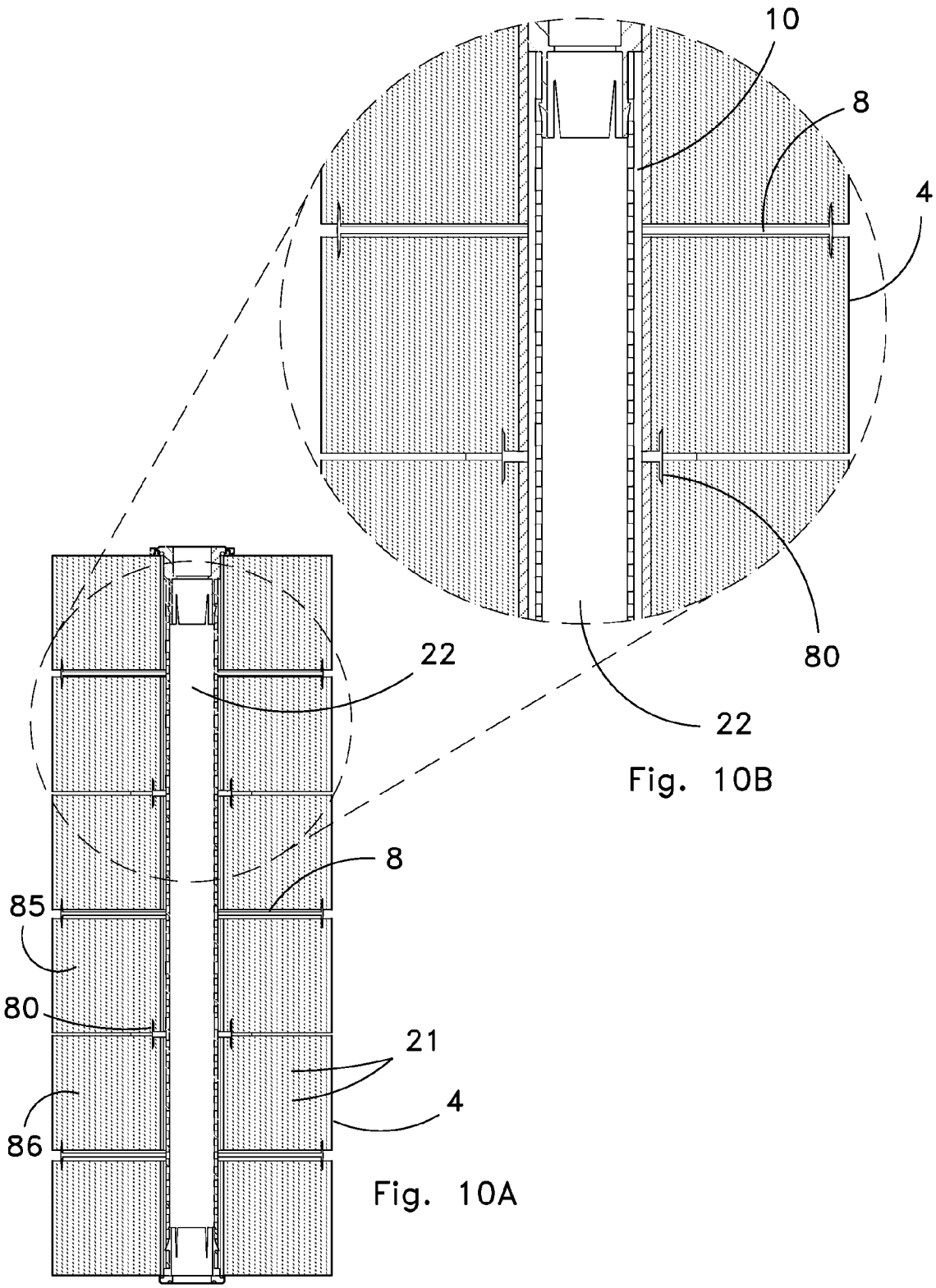

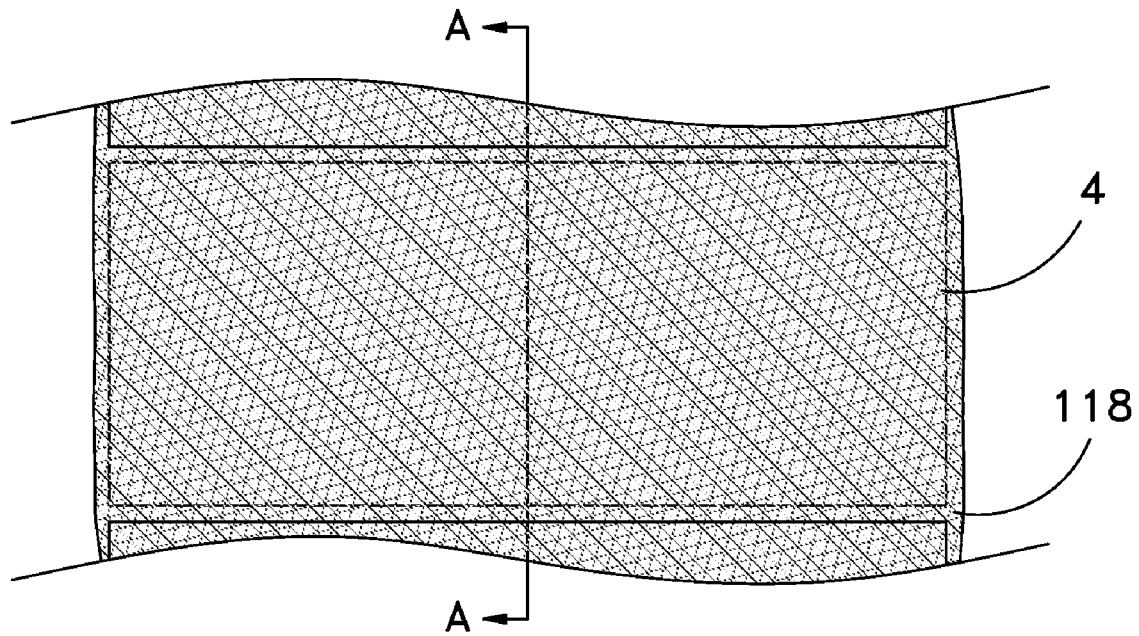
Fig. 11A
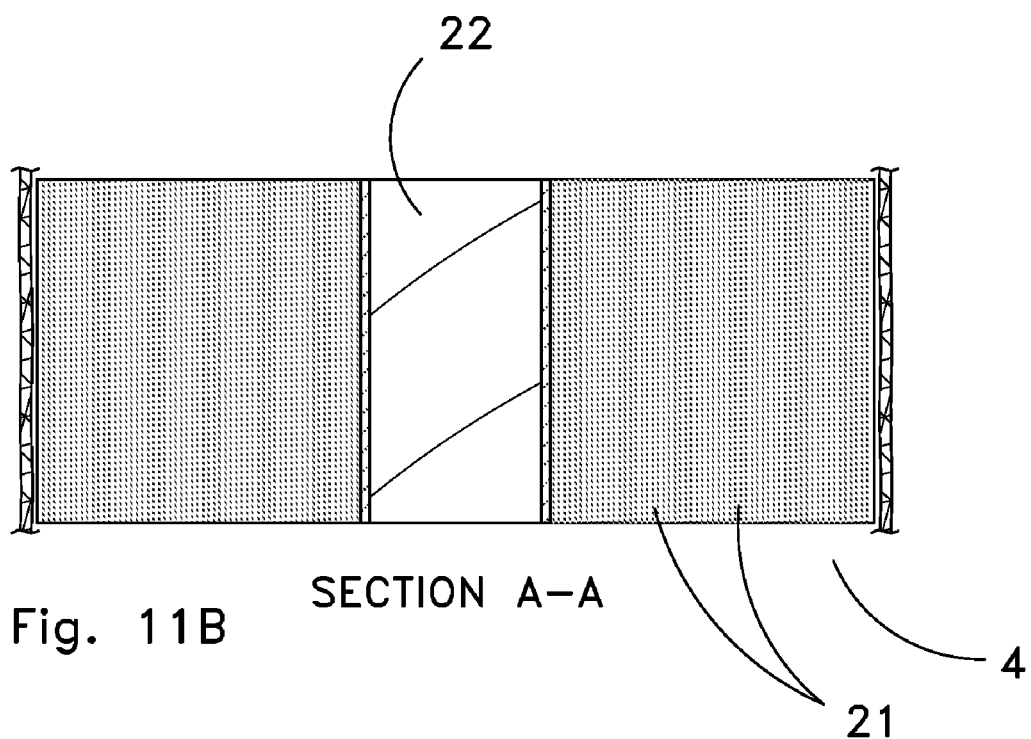
Fig. 11B  SECTION A-A

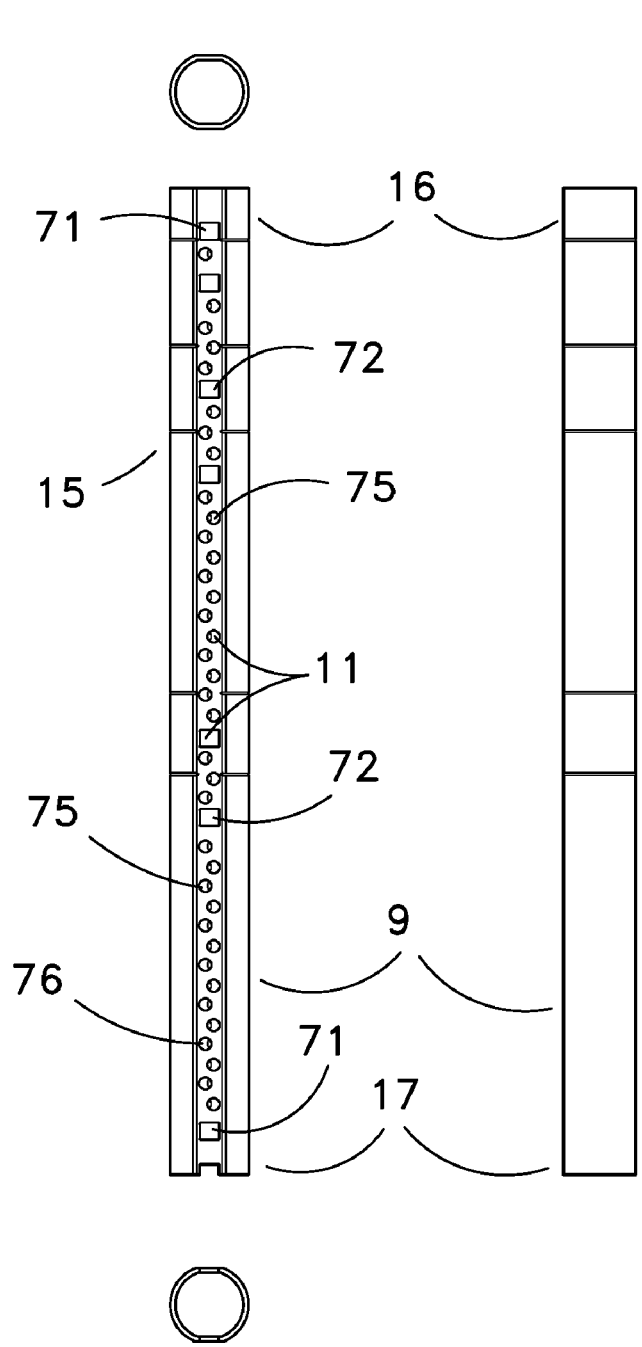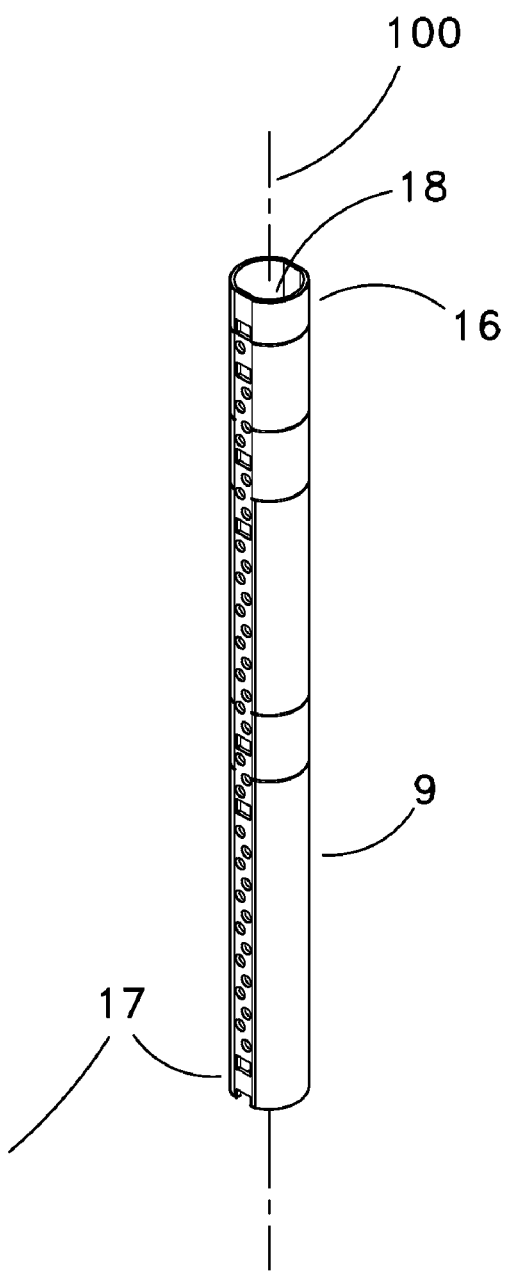
Fig. 15A          Fig. 15B          Fig. 15C

USFLUID FILTER APPARATUS AND METHODS

BACKGROUND OF THE INVENTION

There is a maxim that four quarts of clean oil mixed with one quart of dirty oil makes five quarts of dirty oil. In the area of fluid filtering apparatus and related filtering applications, this is especially true. Modern vehicles and industrial machinery rely on a number of re-circulating fluids for effective operation. Effective filtration of these fluids can extend the life of the apparatus and maintain the operation at high levels of performance. Furthermore, to the extent fluids can be maintained free of contamination, the life of the fluid itself is extended, saving cost due to fluid replacement and machinery downtime.

One particularly effective type of fluid filter causes fluids to flow interstitially between layers of fibrous tissue established around an inner core such as a filtered fluid conduit. Such fluid filters may be packaged either as disposable canisters, replaceable cartridges, or as containers; filters may include generally two, four, six or eight (etc.) filter media rolls around a filtered fluid conduit. Typically, one or more units may be found in a filter; a unit has two rolls, one above the other, separated by a fluid collector. When more than one unit is used, units may be stacked atop each other, each separated by a seal. The top of the upper unit and the bottom of the lower unit may have an upper end cap and lower end cap, respectively, where the upper end cap may block from into or out of a central filtered fluid conduit and the lower end cap may allow fluid out of that central filtered fluid conduit (and then out of the entire filter through a filtered fluid outlet port). In-flow and out-flow connections provide the filter's inlet and outlet ports. By pressuredly flowing "dirty" fluid interstitially between the layers of filtering tissues, dirt, particles and/or and smudge is removed from the fluid by the tissue layers. Generally, fluid may exit the filter rolls, then is directed in part by a filtered fluid collector towards a filtered fluid conduit which, once inside, is delivered by the conduit to a filtered fluid outlet port.

Although convention models—including those utilizing anti-channeling technologies as discussed in U.S. Pat. No. 6,270,668, hereby incorporated herein by reference—are quite effective in filtering fluids, there is certainly some room for improvement. Particular embodiments of the inventive technology may improve filter efficiency by enabling a greater throughput per time at a given operative pressure as compared with conventional technologies. Such improvement may result from provision of at least one filtered fluid channel running alongside the filtered fluid conduit and of a greater number of holes established along the length of the conduit, such holes allowing for passage of filtered fluid from the channel(s) to the filtered fluid conduit and thereafter out of the filter. Additional aspects of attributable to the inventive technology—particularly the provision of snap on end caps, conduit length cut guides that enable cutting of different lengths of conduit from the same conduit stock, and holes that "double" as filtered fluid passages and end cap engagement sites—may result in improved and more cost-effective manufacturing. Of course, other advantages and goals of the inventive technology may be disclosed elsewhere in this specification.

SUMMARY OF THE INVENTION

Particular aspects of the inventive technology may, in embodiments, relate to a fluid filter apparatus that includes a filtered fluid conduit that has a length that is at least three times a characteristic diameter; and a plurality of holes, wherein at least one of said holes has a first shape and engages an end cap during fluid filter operation, and wherein at least one other of said holes has said first shape and passes filtered fluid from outside of said filtered fluid conduit to a conduit interior during fluid filter operation. Other aspects of the inventive technology, whether as inventive apparatus and/or inventive methods, may more particularly relate to a filtered fluid channel established between a longitudinal portion of a filtered fluid conduit and at least one filter medium roll that surrounds the conduit; end cap(s) that snap engage the filtered fluid conduit; the use of conduit length cut guides to facilitate conduit customization for a particular filter application; and an unfiltered fluid seal having structural separator(s) that may improve filter efficiency.

BRIEF DESCRIPTION OF THE DRAWINGS

FIG. 9A and FIG. 9B (close up) show a vertical cross-section of an embodiment of a filter fluid apparatus having a filtered fluid conduit, filtered fluid collectors, unfiltered fluid seals, filter medium rolls and end caps.

FIG. 10A and FIG. 10B (close up) show a vertical cross-section of an embodiment of a filter fluid apparatus having a filtered fluid conduit, filtered fluid collectors, unfiltered fluid seals, filter medium rolls and end caps. The view shown in FIG. 10 is rotated 90 degrees relative to FIG. 9.

FIG. 11A shows a side view of a filter medium roll (and portions of rolls thereabove and below), and a sock around the rolls. FIG. 11B shows a roll of FIG. 11A in partial cross-section (partial because the tube is not shown in cross-section, for illustration purposes).

FIGS. 15A, B and C shows three views (first side, showing holes, second side not showing holes, and perspective) of an embodiment of a filtered fluid conduit, without end caps, in addition to showing views from the top and bottom thereof. This embodiment has a different hole pattern from that of FIG. 13.

FIGS. 16A, B and C do not show conduit length cut guides.

DETAILED DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 4:
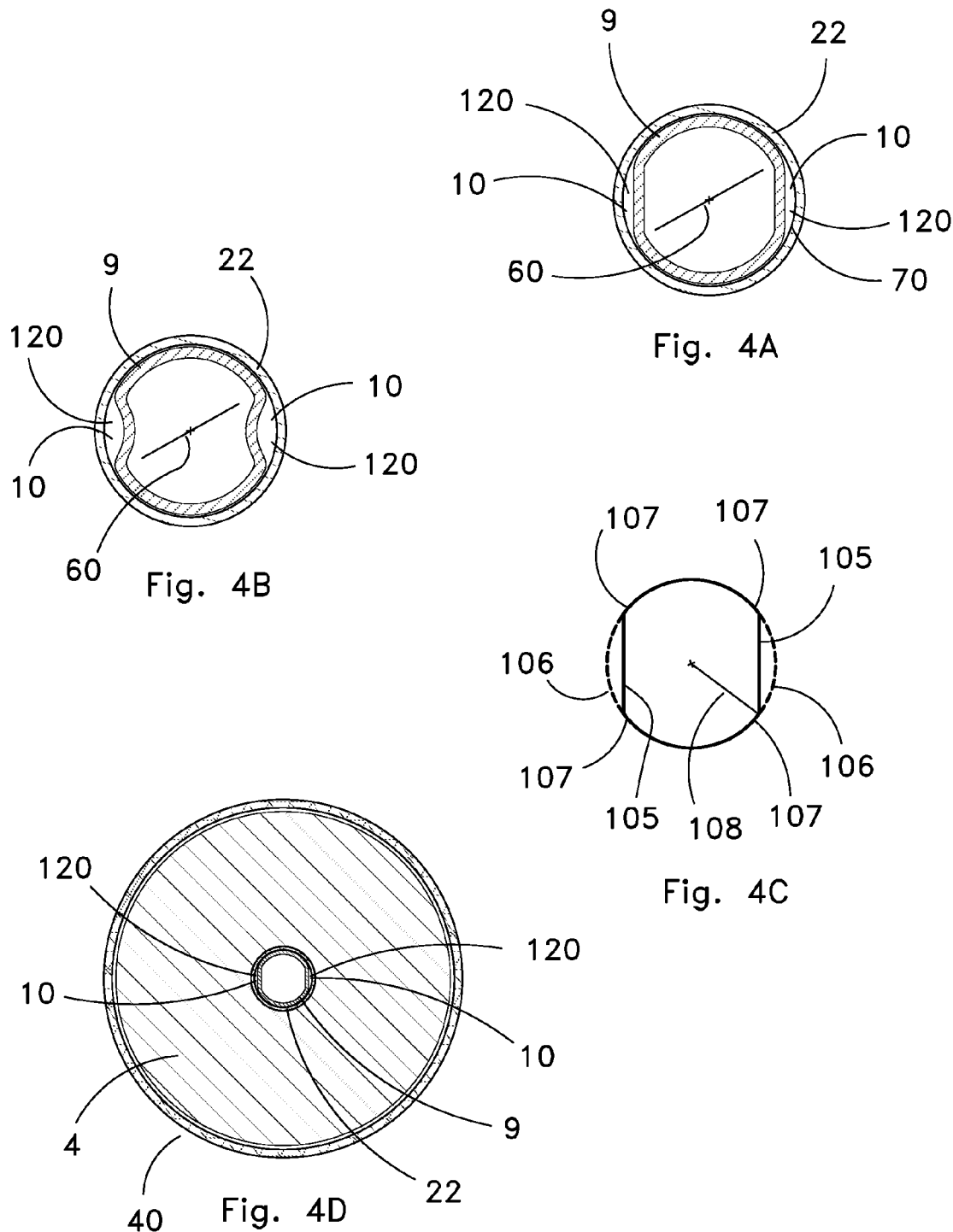
FIGS. 4A and 4B shows views of embodiments of a filtered fluid conduit and a surrounding tube in horizontal cross-sectional view.
FIG. 4C shows a horizontal cross-sectional profile of an embodiment of a filtered fluid conduit.
FIG. 4D shows a horizontal cross-section of an embodiment of a fluid filter apparatus, showing a filtered fluid conduit, a tube, filter medium roll and a sock.
Figure 5:
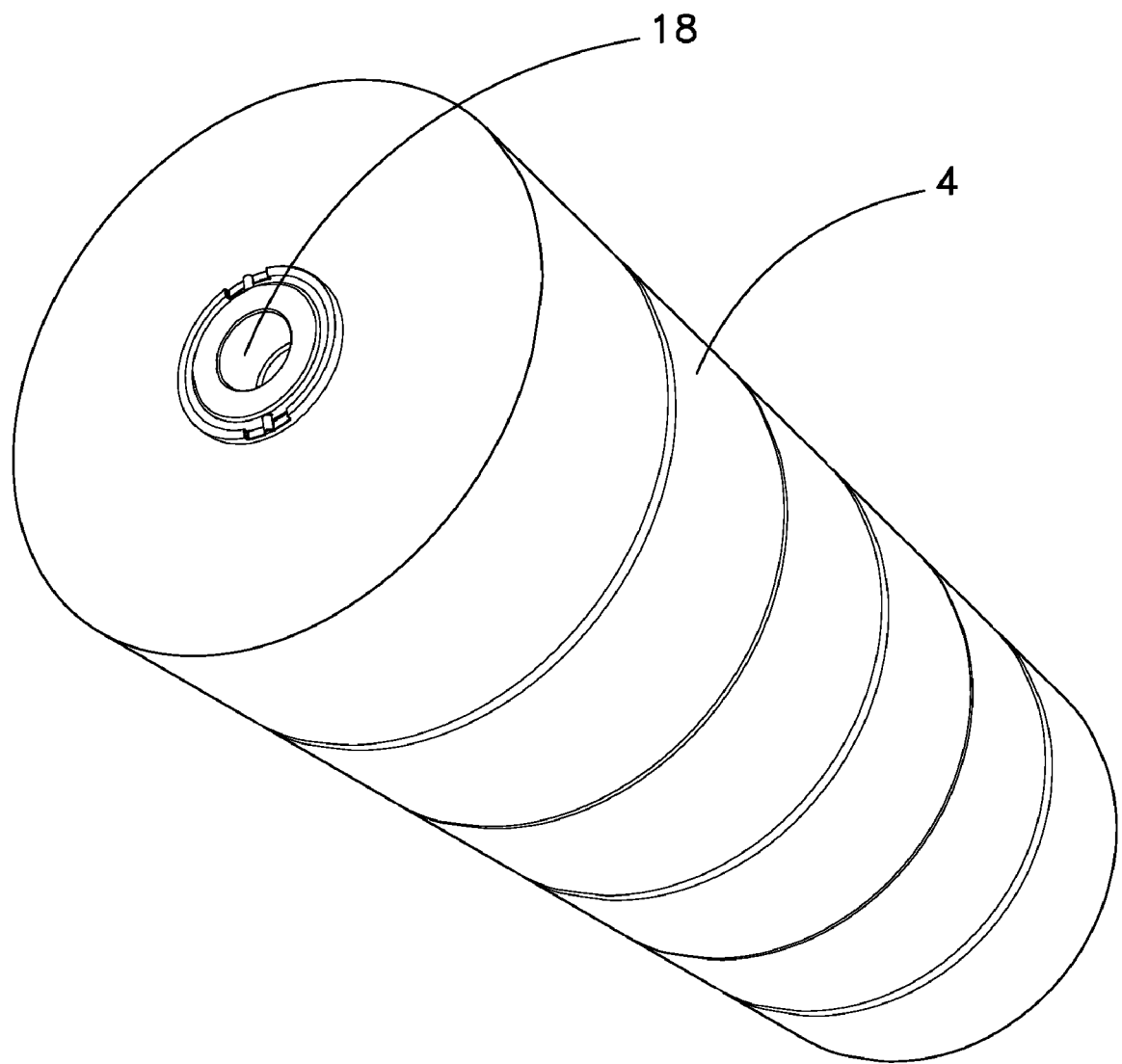
FIG. 5 shows a view of an embodiment of a fluid filter apparatus, showing filter medium rolls stacked around a filtered fluid conduit.
Figure 6A:
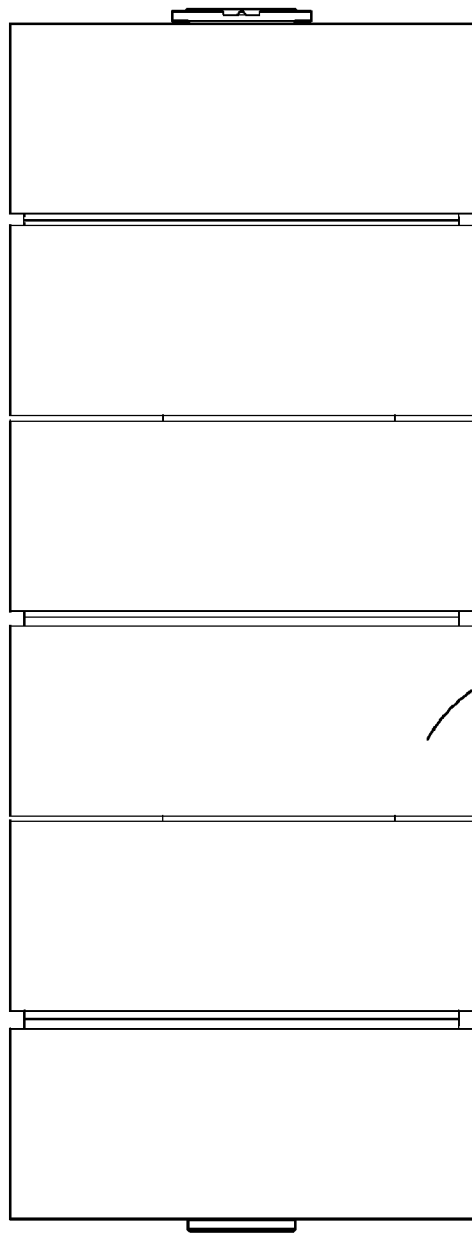
FIG. 6A shows a view of an embodiment of a fluid filter apparatus, showing filter medium rolls stacked around a filtered fluid conduit.
Figure 6B:
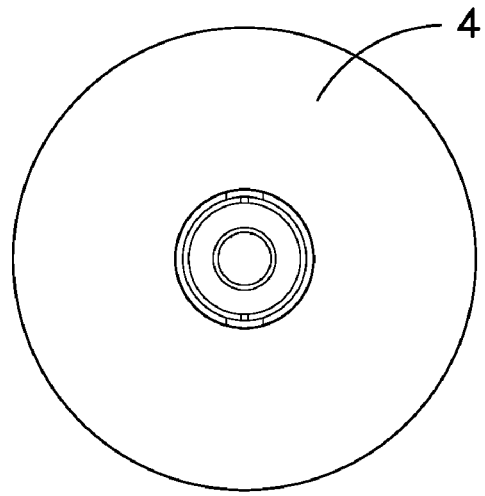
FIGS. 6B and 6C show a view from each above and below the apparatus shown in FIG. 6A.
Figure 6C:
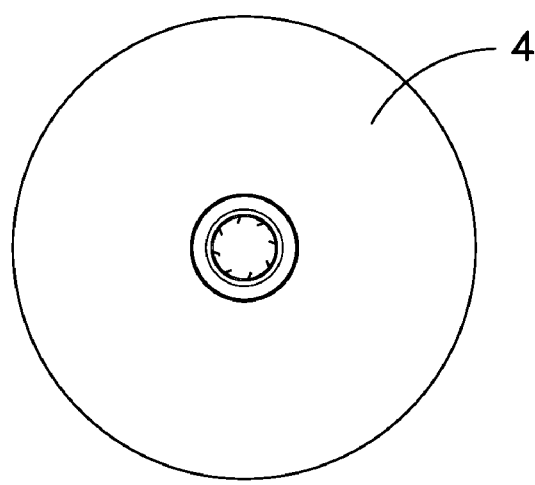
Figures 7A, 7C:
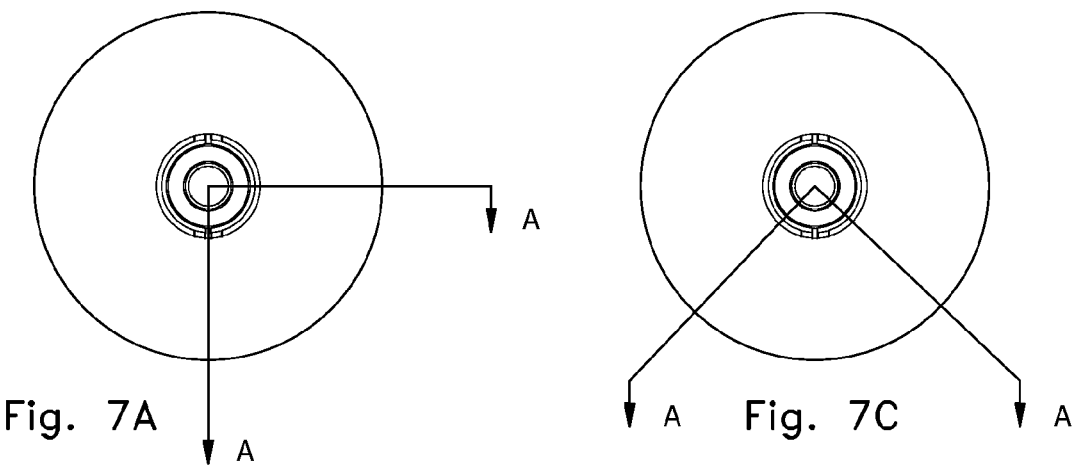
FIGS. 7A and 7B relate to one vertical, ¼ cross-sectional view, and FIGS. 7C and 7D relate to another vertical, ¼ cross-sectional view of the apparatus of FIG. 6A.
Figures 7B, 7D:
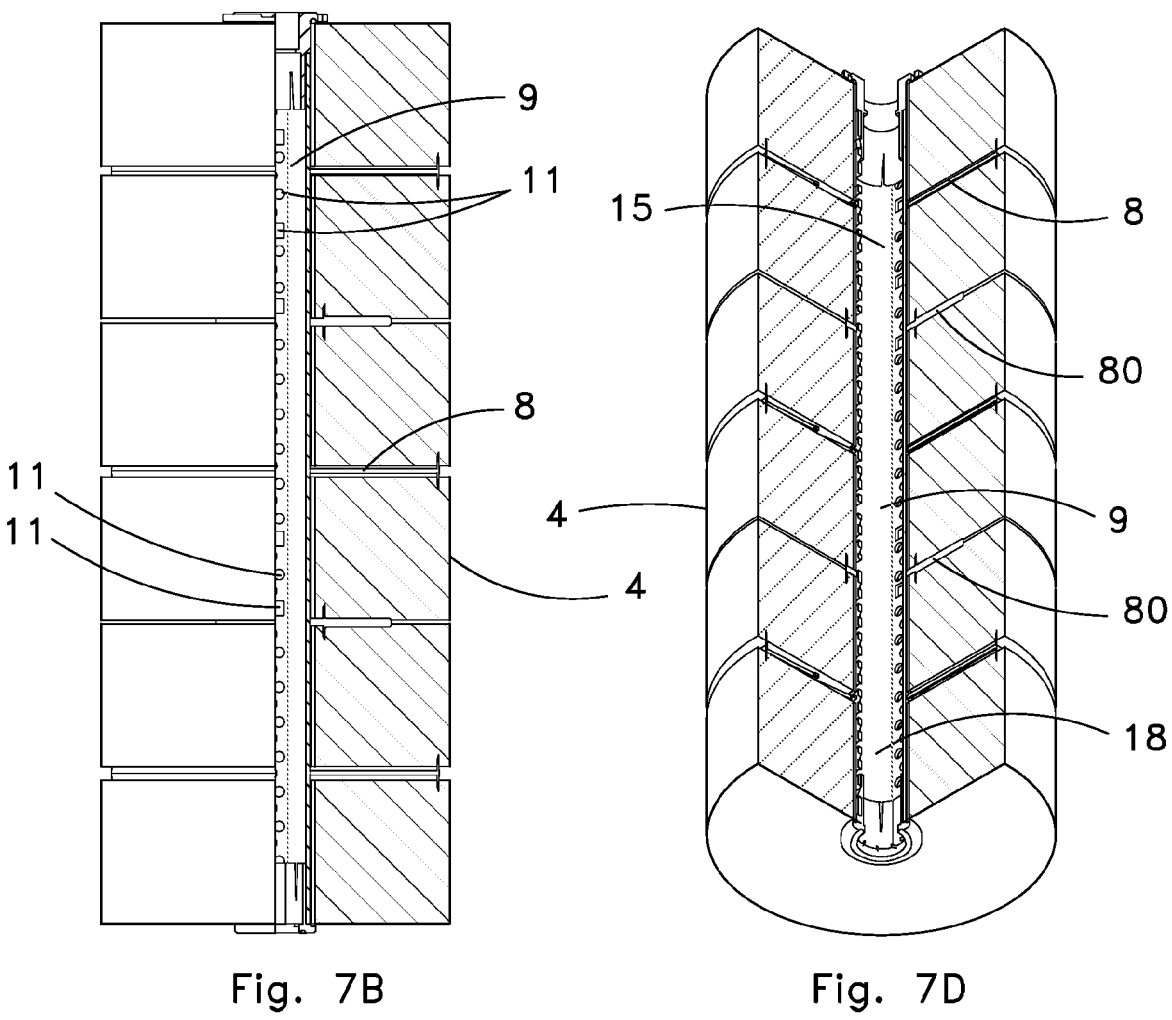
Figures 8A, 8B, 8C:
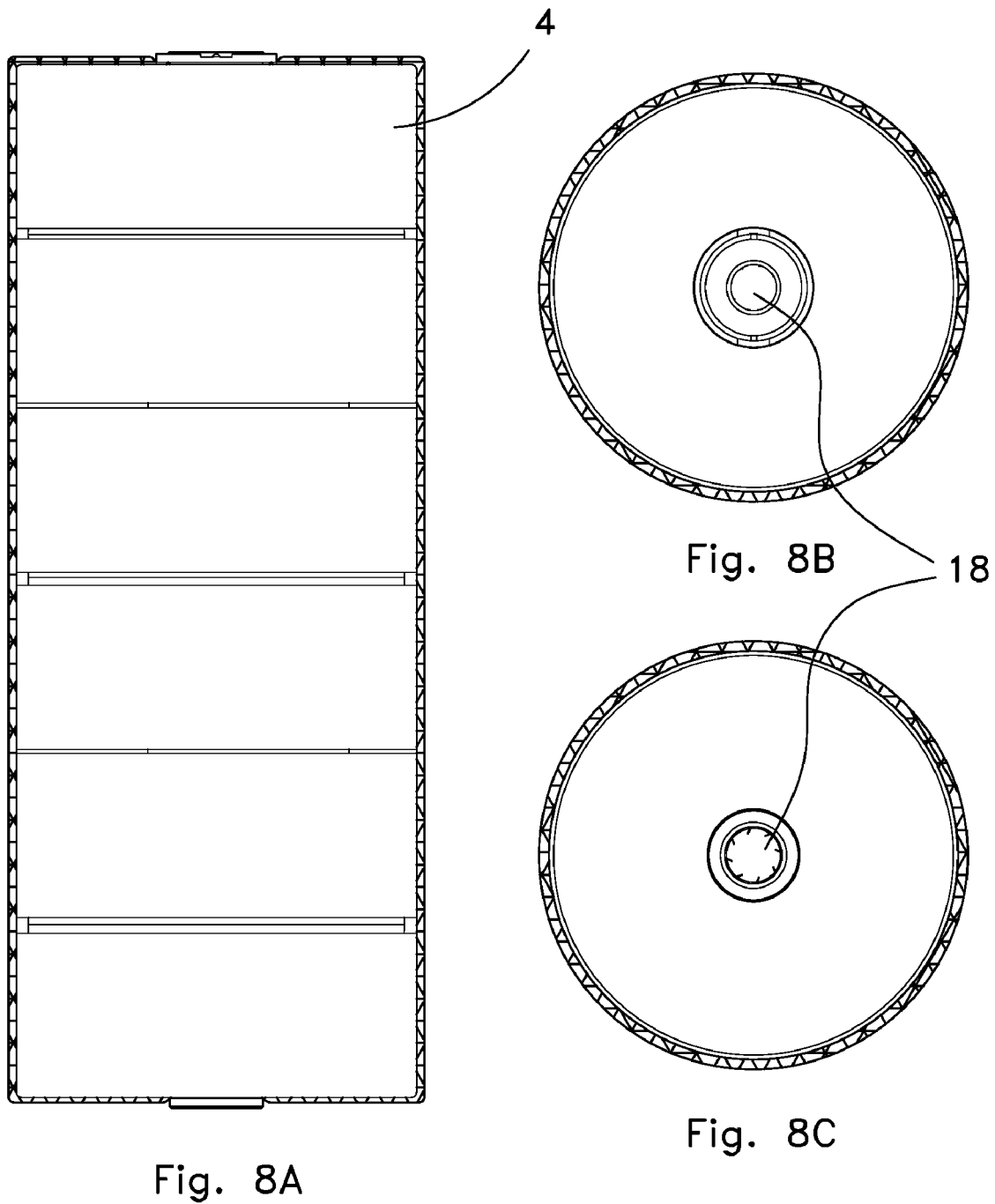
FIG. 8A shows a side view, FIG. 8B a top view, and FIG. 8C a bottom view of the apparatus of FIG. 6, in addition to showing the sock which may be established around the filter medium rolls.
Figures 12A, 12B, 12C:
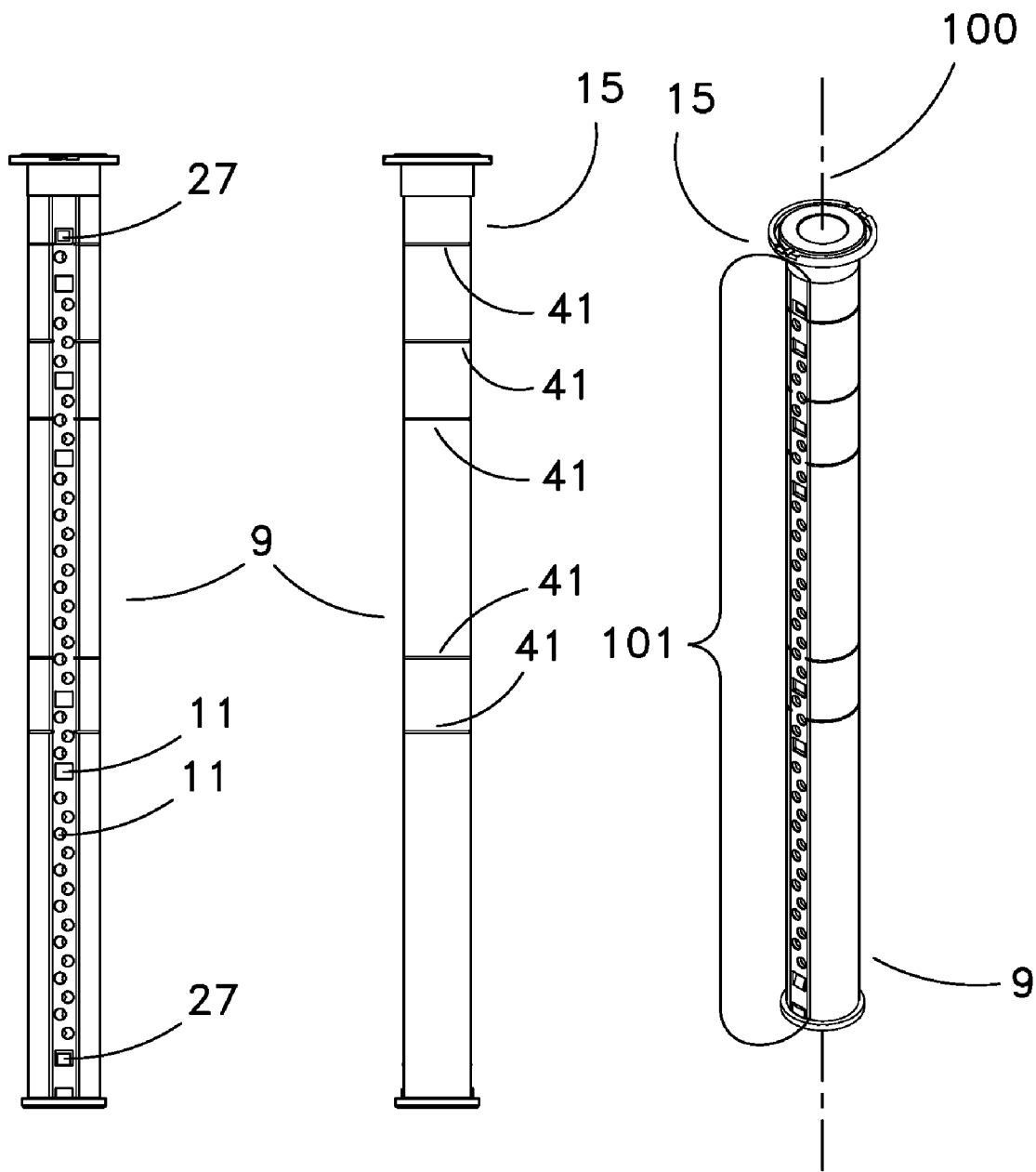
FIG. 12A shows a view of a side (with holes) of an embodiment of a filtered fluid conduit.
FIG. 12B shows a side without holes.
FIG. 12C shows a perspective view.
Figures 13A, 13B, 13C:
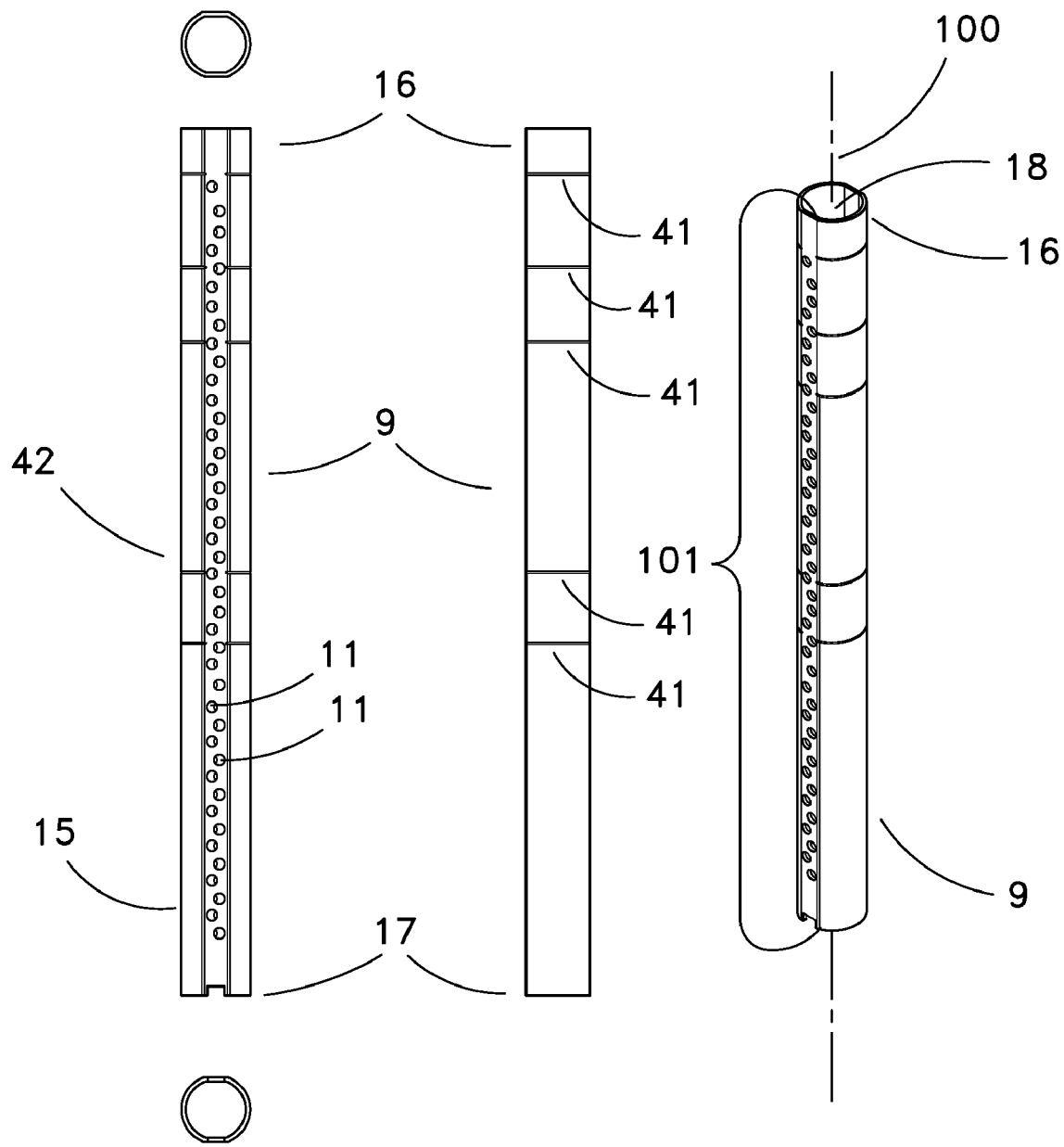
FIGS. 13A, B and C shows three views (first side, showing holes, second side not showing holes, and perspective) of an embodiment of a filtered fluid conduit, without end caps, in addition to showing views from the top and bottom thereof.
Figures 14A, 14B, 14C:
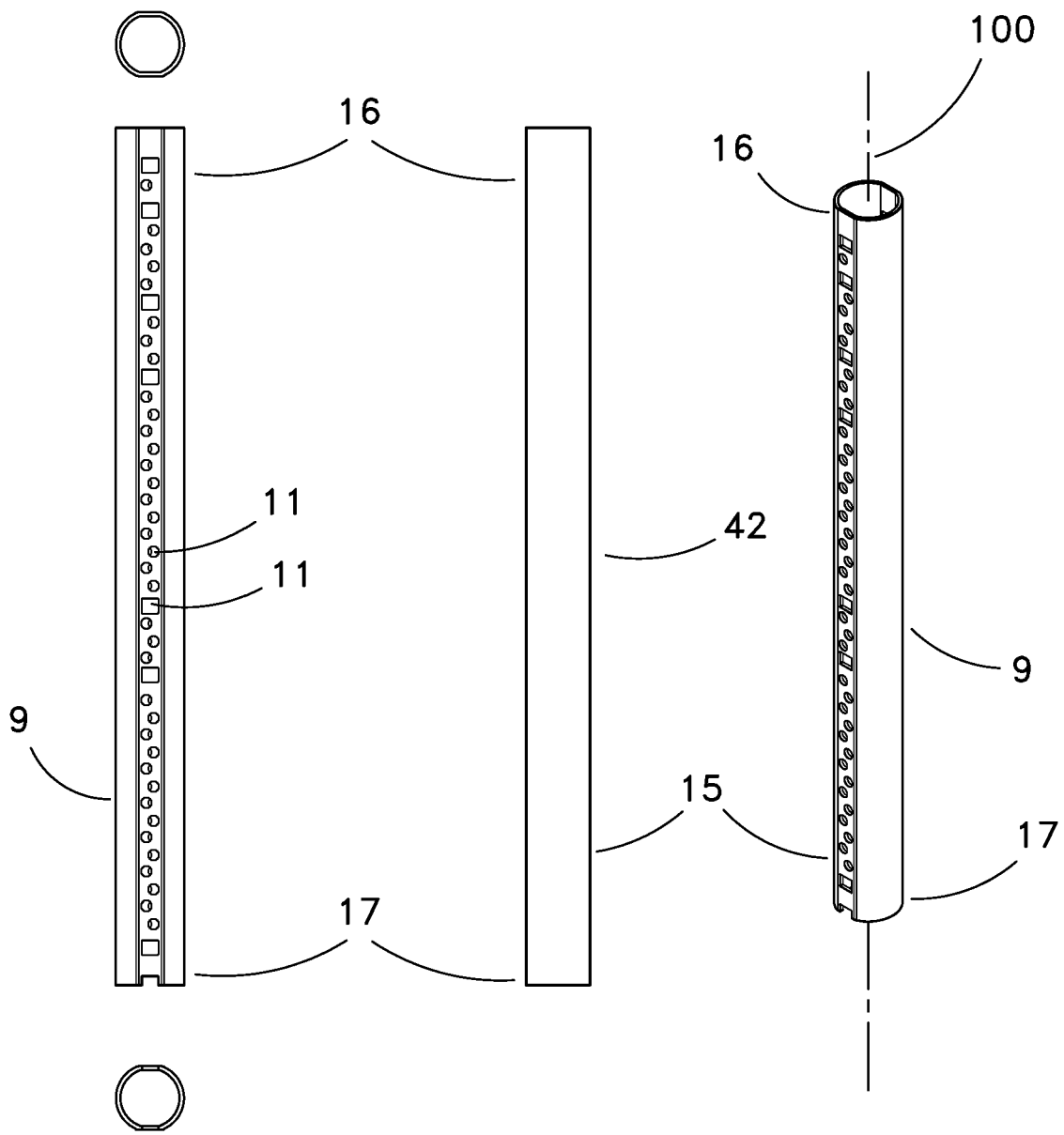
FIGS. 14A, B and C shows three views (first side, showing holes, second side not showing holes, and perspective) of an embodiment of a filtered fluid conduit, without end caps, in addition to showing views from the top and bottom thereof. This embodiment does not show length conduit cut guides on the conduit and shows a hole pattern that is different from that hole pattern shown in FIG. 13.
Figures 16A, 16B, 16C:
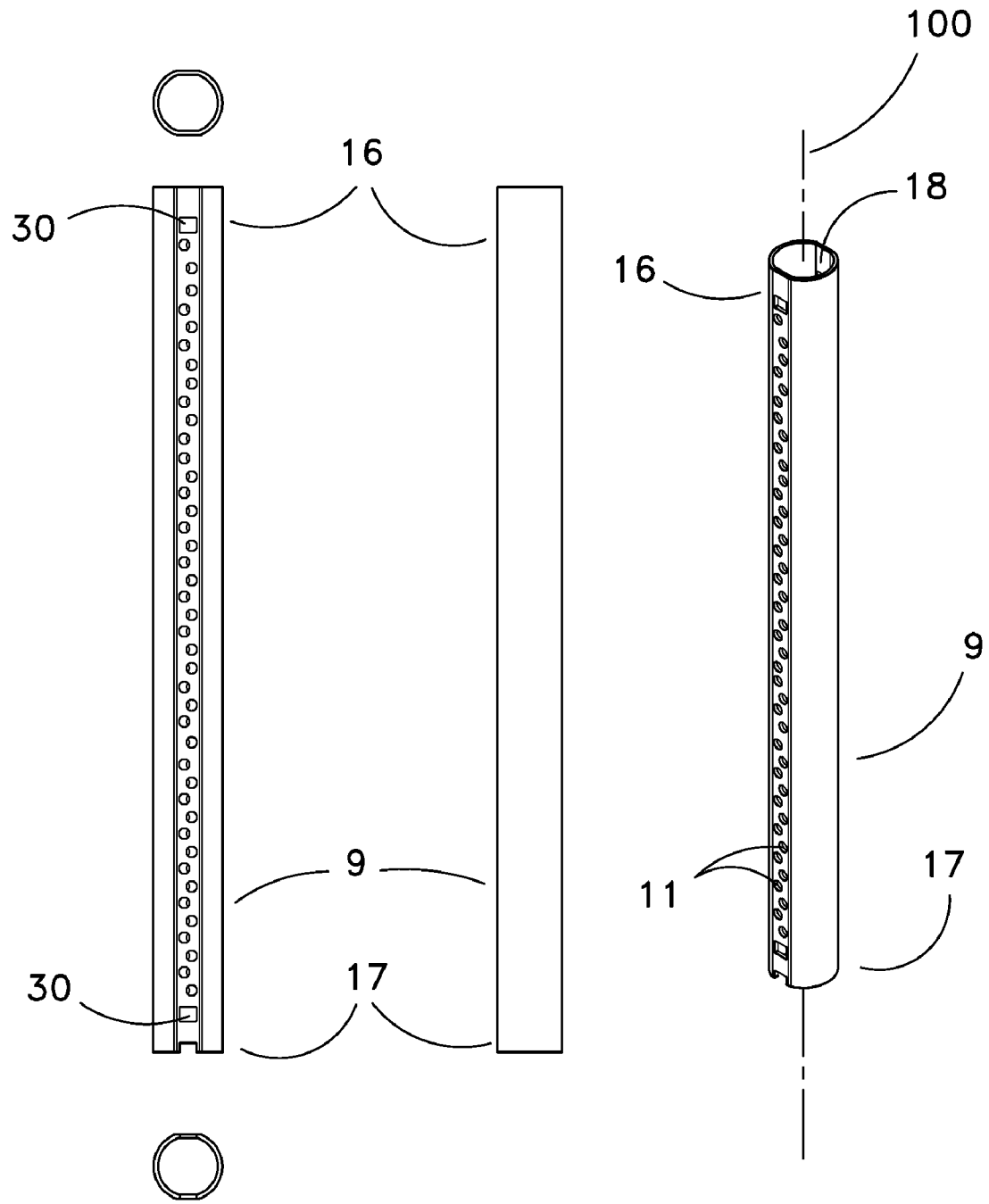
FIGS. 16A, B and C shows three views (first side, showing holes, second side not showing holes, and perspective) of an embodiment of a filtered fluid conduit, without end caps, in addition to showing views from the top and bottom thereof.
Figure 17:
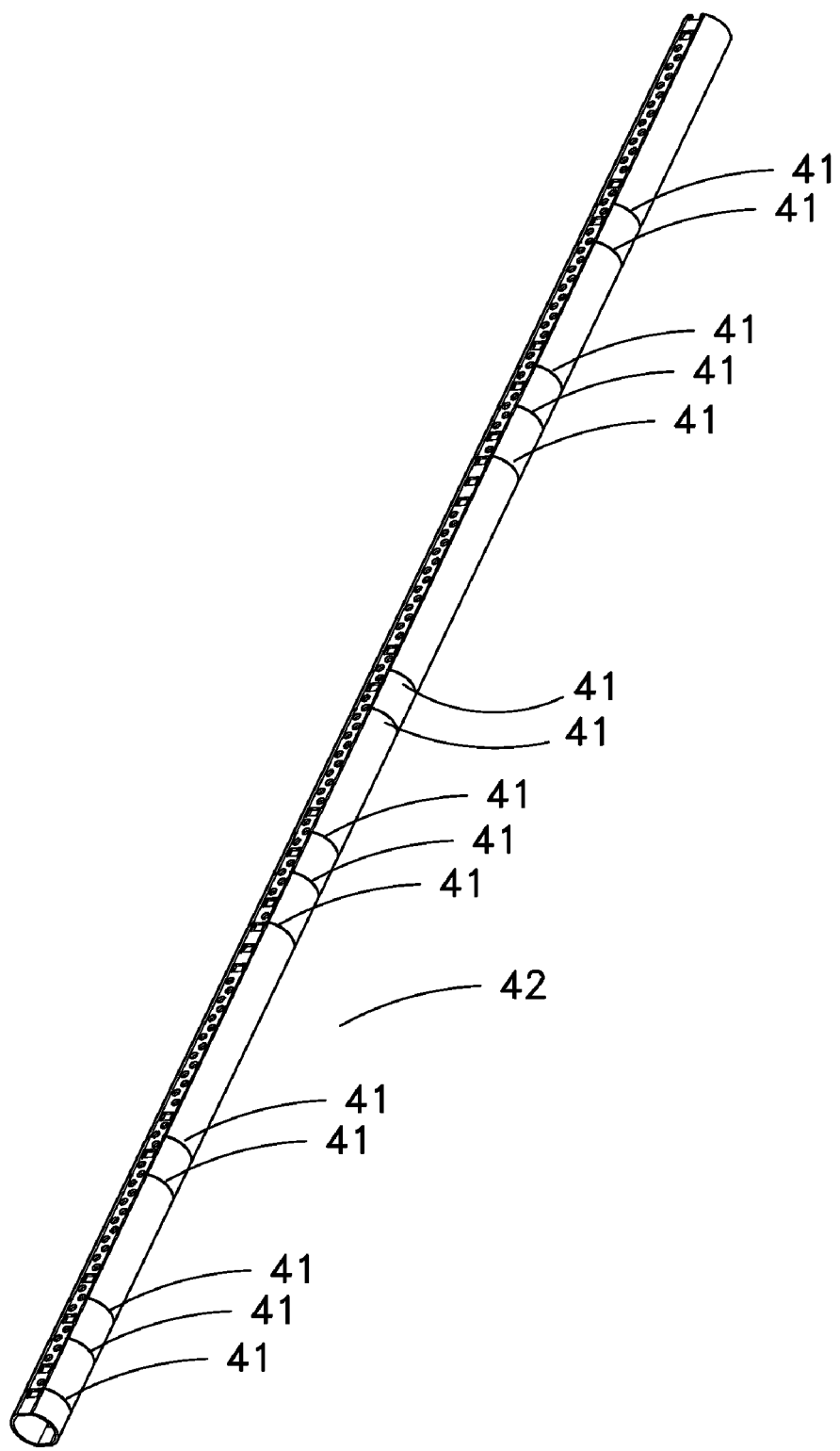
FIG. 17 shows a view of an embodiment of filtered fluid conduit stock.
Figures 18A, 18B:
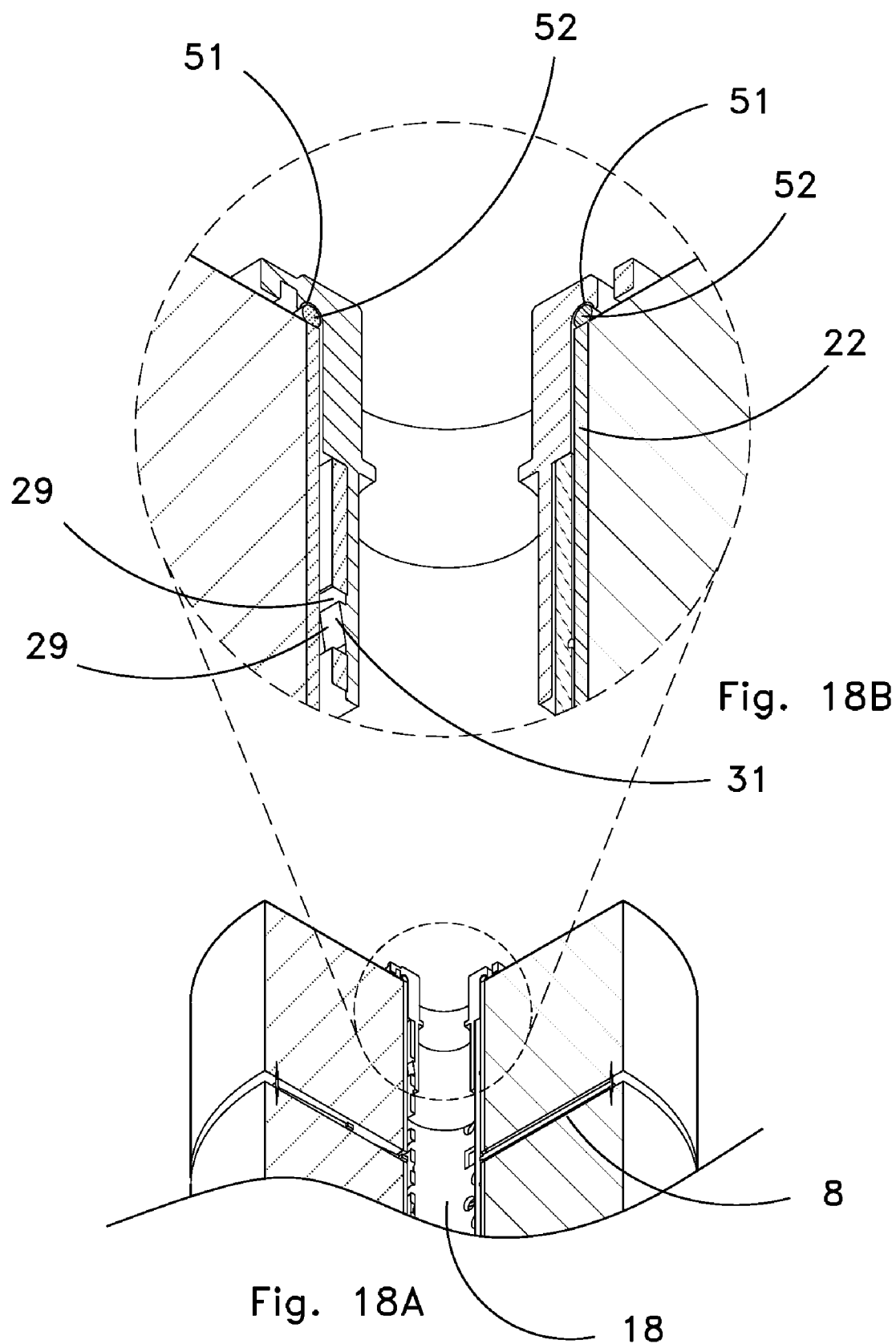
FIG. 18 shows a ¼ cross-section view of an embodiment of a fluid filter apparatus having a filtered fluid conduit, an upper end cap, filter medium rolls and filtered fluid collector, and a close-up view thereof.
Figure 19A:
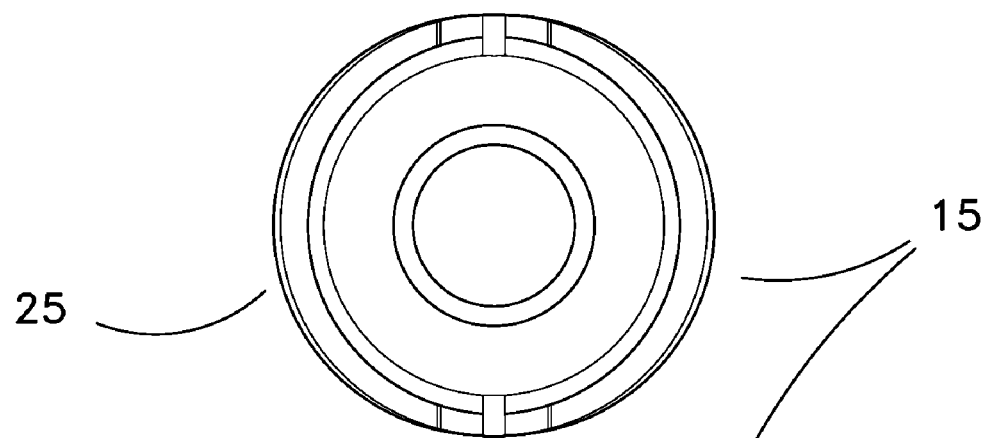
FIGS. 19A, B and C show top, side and bottom views, respectively, of an embodiment of a top end cap, with handle partially deployed.
Figure 19B:
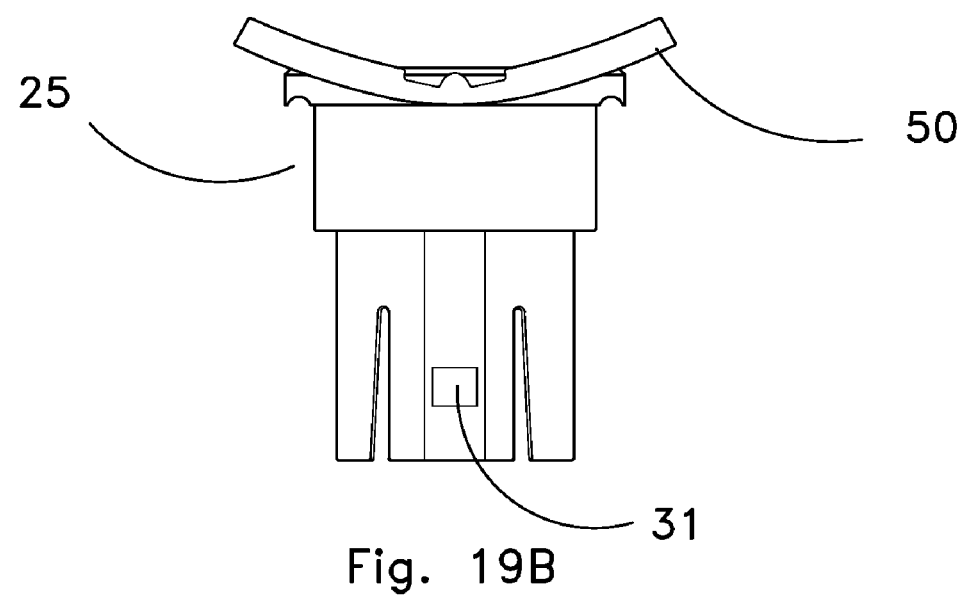
Figure 19C:
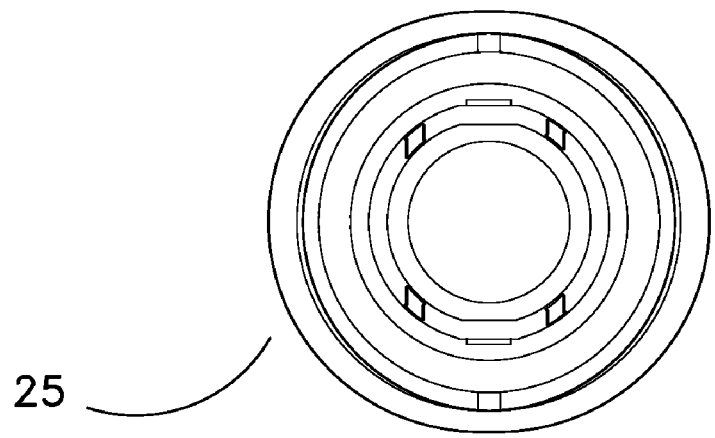
Figure 20A:
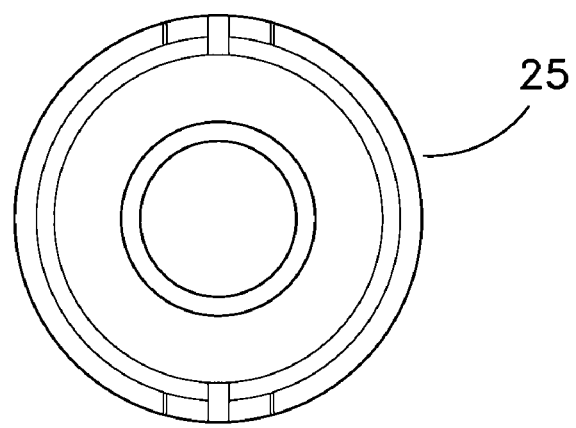
FIGS. 20A, B and C show top, side and bottom views, respectively, of an embodiment of a top end cap.
Figure 20B:
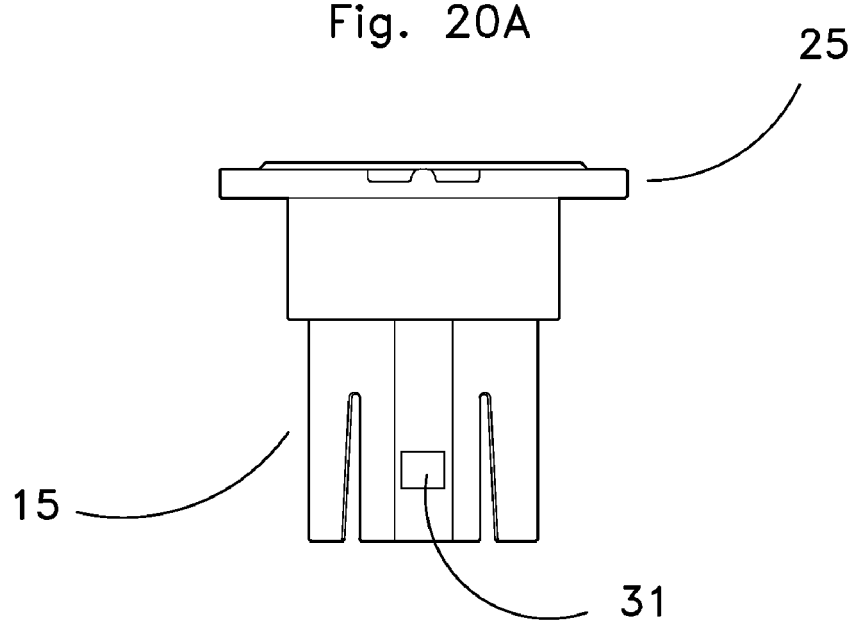
Figure 20C:
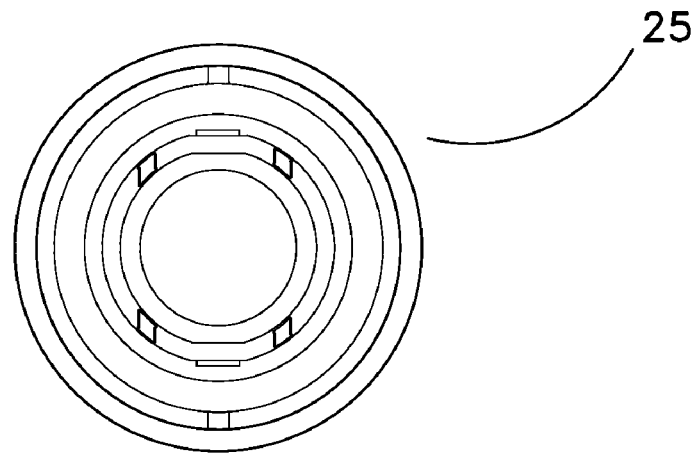
Figure 21A:
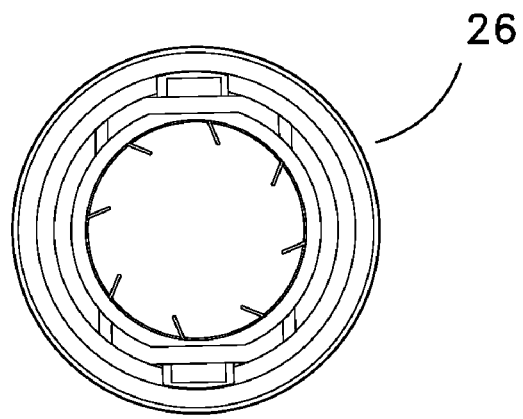
FIGS. 21A, B and C show top, side and bottom views, respectively, of an embodiment of a bottom end cap.
Figure 21B:
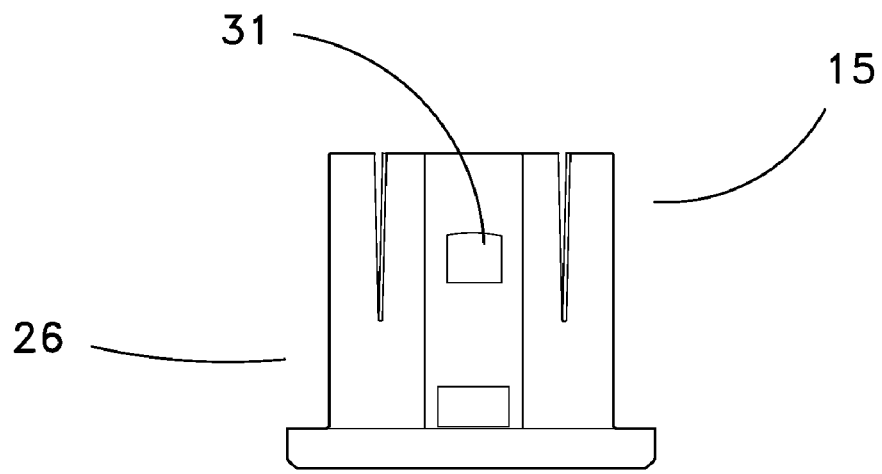
Figure 21C:
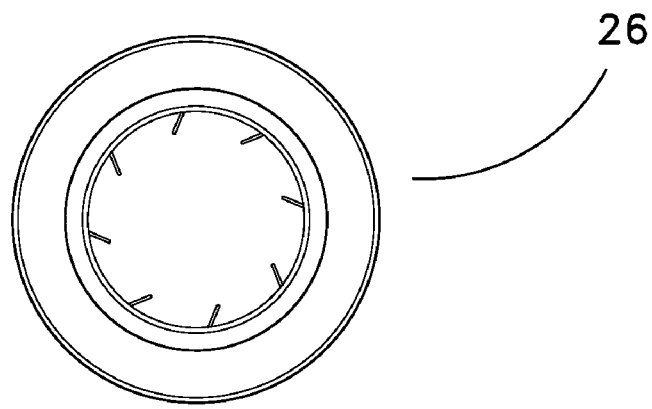
Figure 22A:
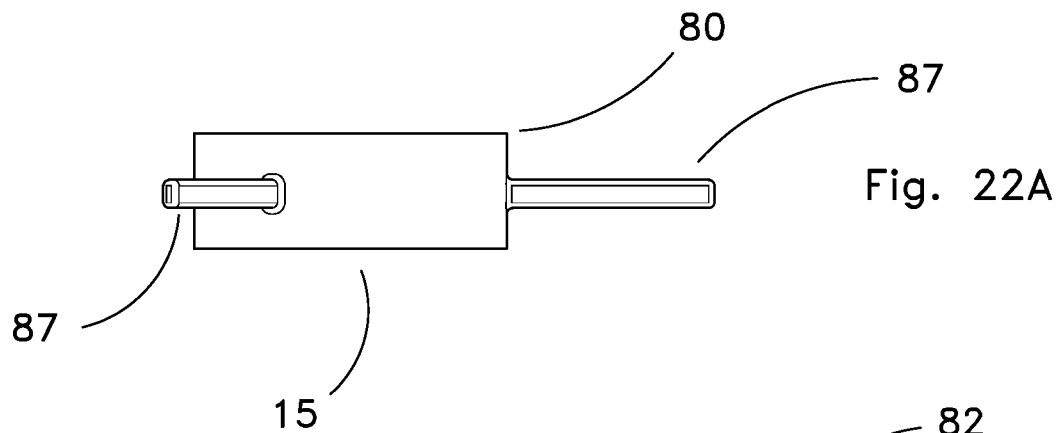
FIGS. 22A, B and C shows side, perspective and top views of an embodiment of an unfiltered fluid seal.
Figure 22B:
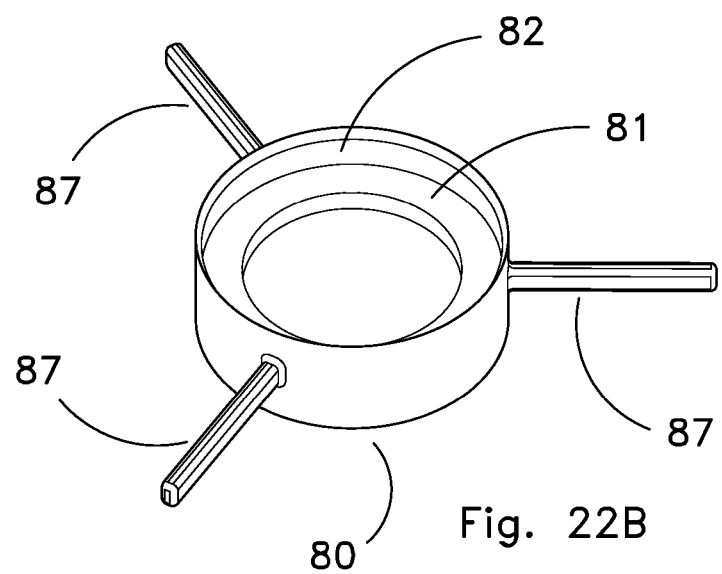
Figure 22C:
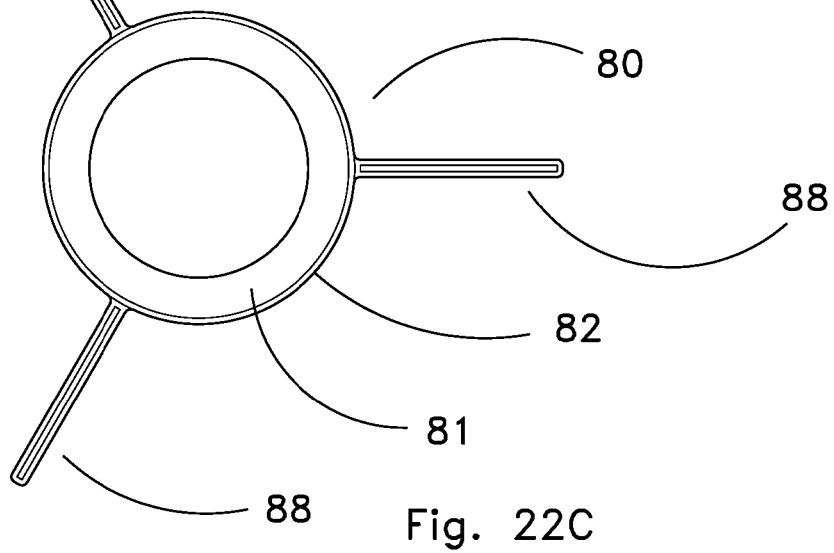
Figure 23A:
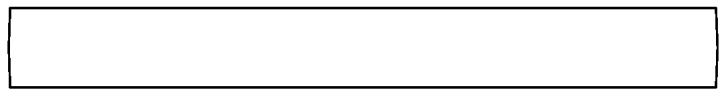
FIGS. 23A, B and C show side, top and perspective views of an embodiment of a filtered fluid collector.
Figure 23B:
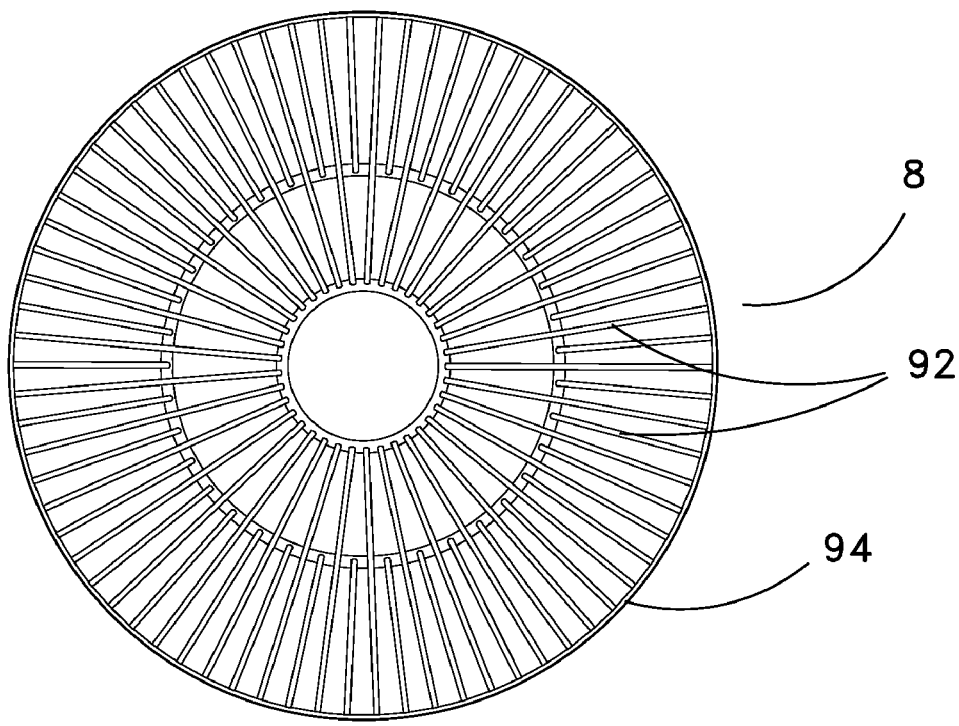
Figure 23C:
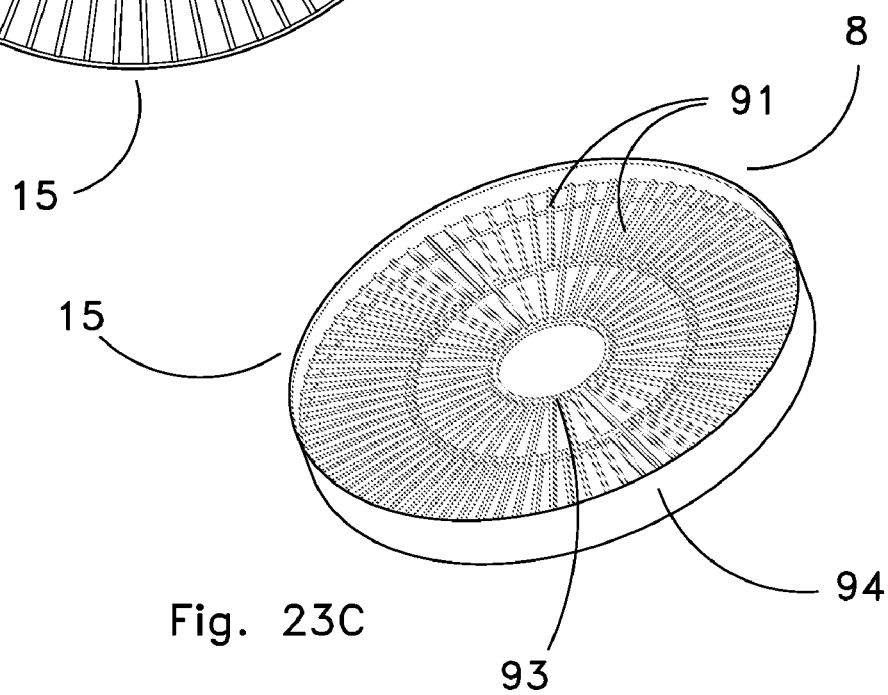

Typically, a fluid filter 1 embodying aspects of the inventive technology may be pressurized during operation; fluid to be filtered typically may be first pressurized (via a pump, e.g.) and subsequently enter an inlet port 2 as shown. It may then flow along the outer periphery 3 of the filter media roll(s) 4, between the roll(s) and a filter housing 41, and flow in any of a number of flow paths 5 to filter medium 6. As the fluid then flows between the wound layers 7 of the filter medium (interstitially), impurities are trapped against such wound layers. Upon reaching a filter fluid collector 8, it may be directed towards filtered fluid conduit 9, at which point it may travel up or down a filtered fluid channel 10 and, after passing through holes 11 in the conduit 9, be delivered by the conduit 9 to the filtered fluid outlet port 12. It is of note that the diagonal lines of the filter medium roll of FIGS. 4D, 7 and 18 are intended as a symbolic representation of a filter medium generally (whether it be rolled layers or otherwise). The vertical lines of FIGS. 3, 9, 10 and 11 show cross-sections of rolls of layered media (including but not limited to rolled layers of tissue 21, polypropylene layers, fibrous layers such as layered paper usable also in coffee filters, etc.)

At least one embodiment of the inventive technology may be a fluid filter apparatus 15 (e.g., an apparatus usable as a part of a filter, or the entire filter itself) such as a filtered fluid conduit 9 that has first and second conduit ends 16, 17 and that defines a conduit longitudinal axis 100 and a conduit interior 18 (even where the conduit has holes 11). The conduit may include at least one longitudinal portion 101 (a length portion of the conduit that may run substantially along at least ½ the entire length thereof) that, when said filtered fluid conduit is surrounded by at least one filter medium roll 4, establishes a filtered fluid channel 10 between the longitudinal portion 101 and the at least one filter medium roll 4. The longitudinal portion may be considered an arc portion of a conduit cross section (e.g., an edge of a pie slice) that is extended over at least half of the length of the conduit).

Further, in preferred embodiments the at least one longitudinal portion 101 may includes a plurality of holes 11. In certain embodiments, the plurality of holes 11 comprise at least one hole having a first shape 71 (e.g., square) and at least one different hole having a second shape 75 (e.g., circular). Certain of the holes—particularly those having the second shape (in those embodiments having holes of two different shapes)—may be exclusively fluid conveyance holes 76 (i.e., holes that are adapted to only pass fluid during filter operation, and not to engage as desired—whether snap-engage or otherwise—any end cap(s)).

In certain embodiments, the at least one longitudinal portion of the filtered fluid conduit has a cross-sectional profile 105 that is intra-radial of a nominal, curved profile extension 106 having a radius equal to that of a cross-section 108 of the filtered fluid conduit that is immediately proximate 107 the longitudinal cross-sectional profile. Such "relative shaping" may effect the filtered fluid channel.

It should be understood that the term filter medium roll 4 includes wound layers 7 of filtered medium (such as tissue layers 21) and may include a tube 22 (distinct from the filtered fluid conduit) around which the filter media is rolled. Such tube may be made of a number of materials (including but not limited to cardboard, metal and plastic) and in a filter, may be established around the filtered fluid conduit 9. Such 22 tube also may fit like a sleeve around (be tight against, perhaps even directly contacting) the filtered fluid conduit except for the longitudinal portion 101 where the filtered fluid channel(s) is, and in a preferred design has a circular cross-sectional shape. In a preferred design, the tube 22 forms a wall of the filtered fluid channel 10, perhaps having other functions (e.g., enhancing the strength of the design, facilitating manufacture of the filter medium roll and/or the filter).

As one filter may have several rolls 4 stacked atop one another, each with its own tube 22, there typically is a break between each roll 4 where there is no tube 22 around the conduit 9. Such break or discontinuity may, by design, allow for the flow of filtered fluid through to a channel 10, where such channel is established above and below such discontinuity and between tubes of filter medium rolls 4 and the filtered fluid conduit 9 around which the rolls 4 are established.

It should be pointed out that, because, during a preferred manufacture procedure of a filter having several filter medium rolls 4, the rolls 4, and the individual tube 22 of each roll, is sequentially stacked atop one another, although alternately separated by an unfiltered fluid seal 80 and filtered fluid collector 8. As such, a part of a typical manufacture procedure may involve sliding a lower filter medium roll on a filtered fluid conduit, then sliding a filtered fluid collector on the filtered fluid conduit and above the lower filter medium roll, then sliding a second filter medium roll on the filtered fluid conduit and above the filtered fluid collector, then, if an additional roll(s) is to be used in the filter, sliding a filtered fluid seal on the filtered fluid conduit and above the second filter medium roll, then, sliding a third filter medium roll on the filtered fluid conduit and above the filtered fluid seal, then sliding a second filtered fluid collector on the filtered fluid conduit and above the third filter medium roll, then sliding a fourth filter medium roll on the filtered fluid conduit and above the second filtered fluid collector, then if an additional roll(s) is to be used in the filter, sliding a second filtered fluid seal on the filtered fluid conduit and above the fourth filter medium roll, then, sliding a fifth filter medium roll on the filtered fluid conduit and above the second filtered fluid seal, then sliding a third filtered fluid collector on the filtered fluid conduit and above the fifth filter medium roll, then sliding a sixth filter medium roll on the filtered fluid conduit and above the third filtered fluid collector, then if an additional roll(s), continuing in such fashion. When the proper number of rolls have been placed onto the conduit for the specific filter, the rolls may be placed in a sock 118 and then capped at both ends with end caps (which, again, may snap engage). As can be readily appreciated from this description, any tubes of the individual rolls will not obstruct filtered fluid from leaving a filtered fluid collector and entering a filtered fluid channel. An additional manufacturing step may involve placing a housing 41 around the filter medium rolls, and constructing inlet and outlet ports 2, 12.

Filtered fluid may flow from the channel 10 through a hole(s) 11 of conduit 9 to the conduit interior, after which it travels to a filter outlet port 12 and exits the filter. This channel 10 delivers, via the passages created by the holes 11, filtered fluid to the conduit interior 18, which then delivers filtered fluid to the filter outlet port 12.

For purposes of clarity of description, as mentioned, at times the filtered fluid conduit 9 may be described as having a first conduit end 16 and a second conduit end 17 (e.g., a top conduit end and a bottom conduit end). In certain embodiments, two conduit end caps (e.g., a top conduit end cap 25 and a bottom conduit end cap 26) may be established substantially at each the first and second conduit ends. Such end caps may be separate parts that engage the conduit. The filtered fluid conduit 9 may have engager parts 27 (e.g., holes) at the first 16 and second conduit ends 17 for engaging the end caps at either or both of the first and second conduit ends. In at least one embodiment, the end caps snap engage the filtered fluid conduit via a snap engager 29 that includes corresponding snap engager parts. Such parts may include a hole 30 and an elastic prong 31 (elastic in that it may elastically bend, perhaps even in springboard fashion) that snaps into such hole. One may be on the conduit at an end thereof, and the corresponding part may be on the end cap that engages the conduit at that end. In a preferred embodiment, two prongs are on each end cap and two corresponding holes are on the conduit for each end cap.

Of course, as mentioned, the entire filter includes some sort of filter medium that actually removes particulate matter and/or other undesirables from the fluid to be filtered (e.g., dirty oil, as but one example). In preferred embodiments, the filter medium is rolled layers 21 of tissue established around a tube 22 and outside of (or "extra-radially") the filtered fluid conduit 9. As mentioned, fluid is filtered as it travels interstitially (between layers). Typical filters also include a housing 40 that is established around the filter medium roll(s).

Particular embodiments may include conduit length cut guides 41 established along filtered fluid conduit stock 42. More than one filtered fluid conduit may be cut from a piece of filtered fluid conduit stock. Cut guides 41 may, as the name suggests, facilitate cutting of stock to particular lengths for different applications requiring differently sized filtered fluid conduits. Particularly where one piece of stock can be used to cut conduit of different lengths as production needs arise (such needs often arise after manufacture of stock), such guides can speed manufacturing and improve manufacturing efficiency. As such, one piece of conduit stock 42 may be used to cut a first, a second and a third length conduit, or that one piece of stock may be used to cut several equal length conduits (e.g., of a first, second or third length).

Cut guides 41 may simply be markings—whether through color or raised ridges or indentations, whether around the entire conduit or not—or may have some other configuration. In a preferred embodiment, they are indentations 44. A fluid filter method relating specifically to conduit length cut guides may comprise the steps of: manufacturing a filtered fluid conduit stock 42 to have a plurality of holes 11, cutting the filtered fluid conduit stock along a conduit length cut guide to create a filtered fluid conduit 9, and engaging (e.g., snap engaging) at least one end cap with the filtered fluid conduit. In preferred embodiments the length cut guides are established on the conduit stock itself.

Figure 1:
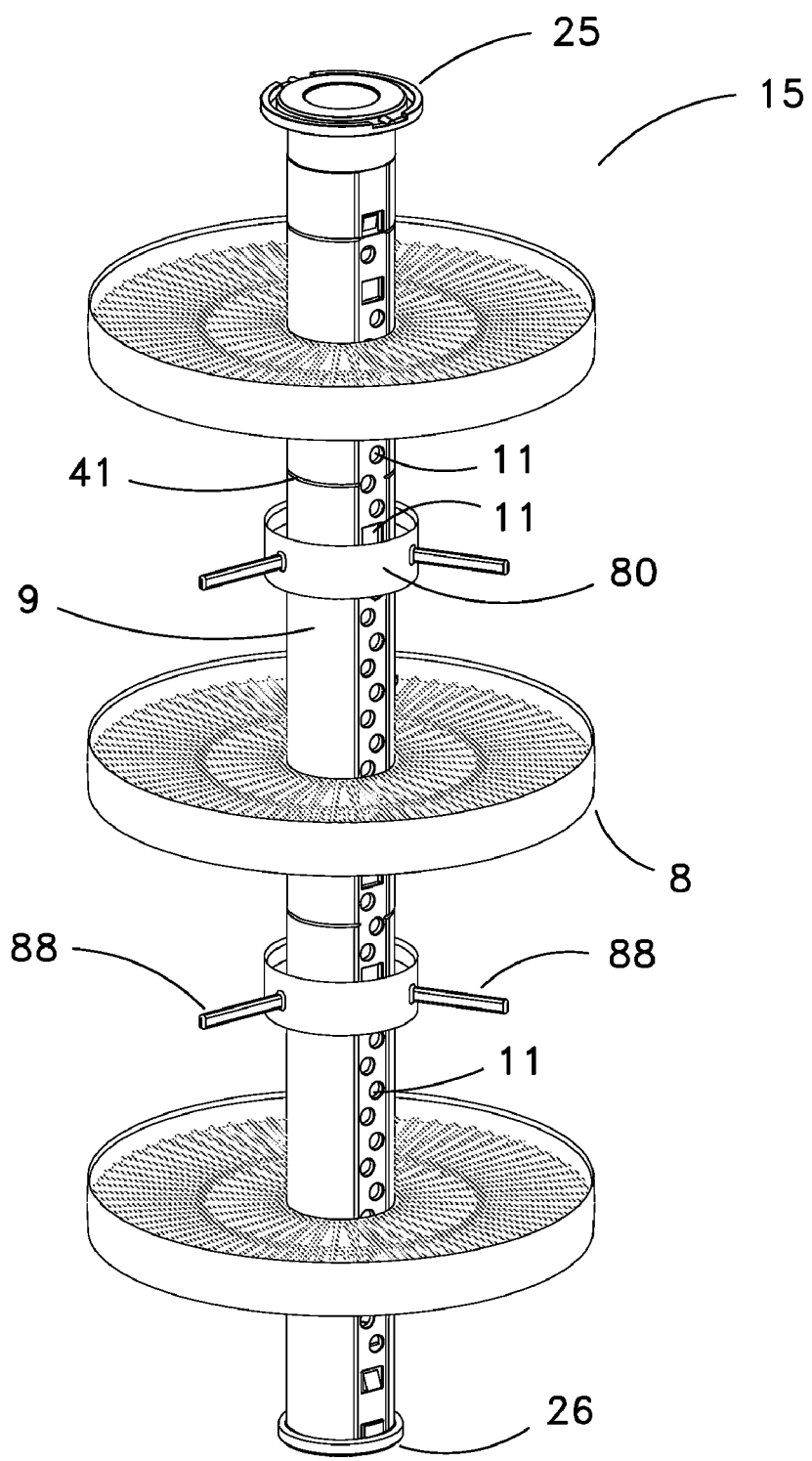
FIG. 1 shows a view of an embodiment of a fluid filter apparatus having a filtered fluid conduit, filtered fluid collectors, unfiltered fluid seals and end caps, but not filter medium rolls or a filter housing.
Figures 2A, 2B:
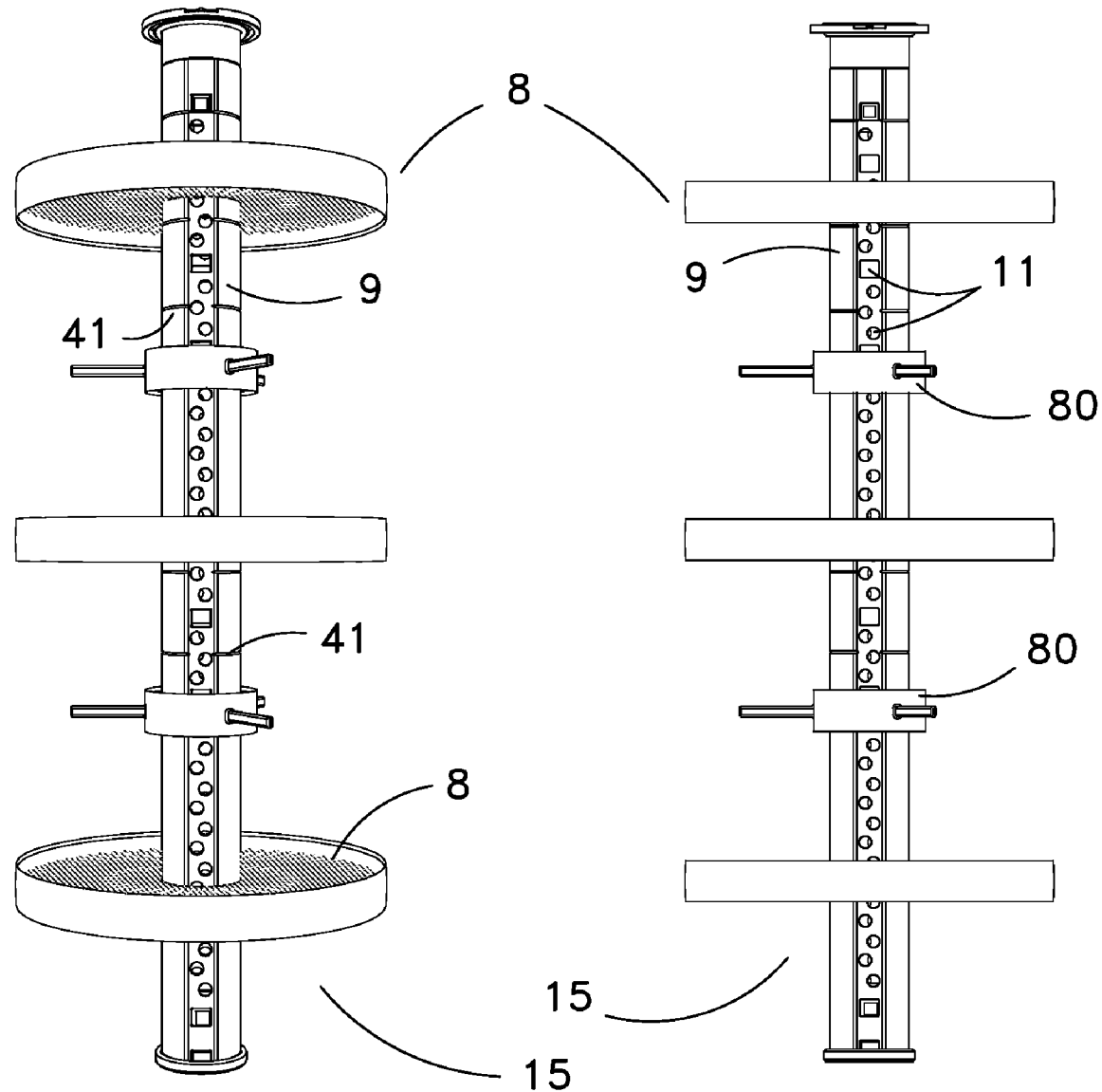
FIG. 2A shows a perspective view and FIG. 2B shows a plan view of an embodiment of a fluid filter apparatus having a filtered fluid conduit, filtered fluid collectors, unfiltered fluid seals and end caps, but not having filter medium rolls or a filter housing.
Figure 3:
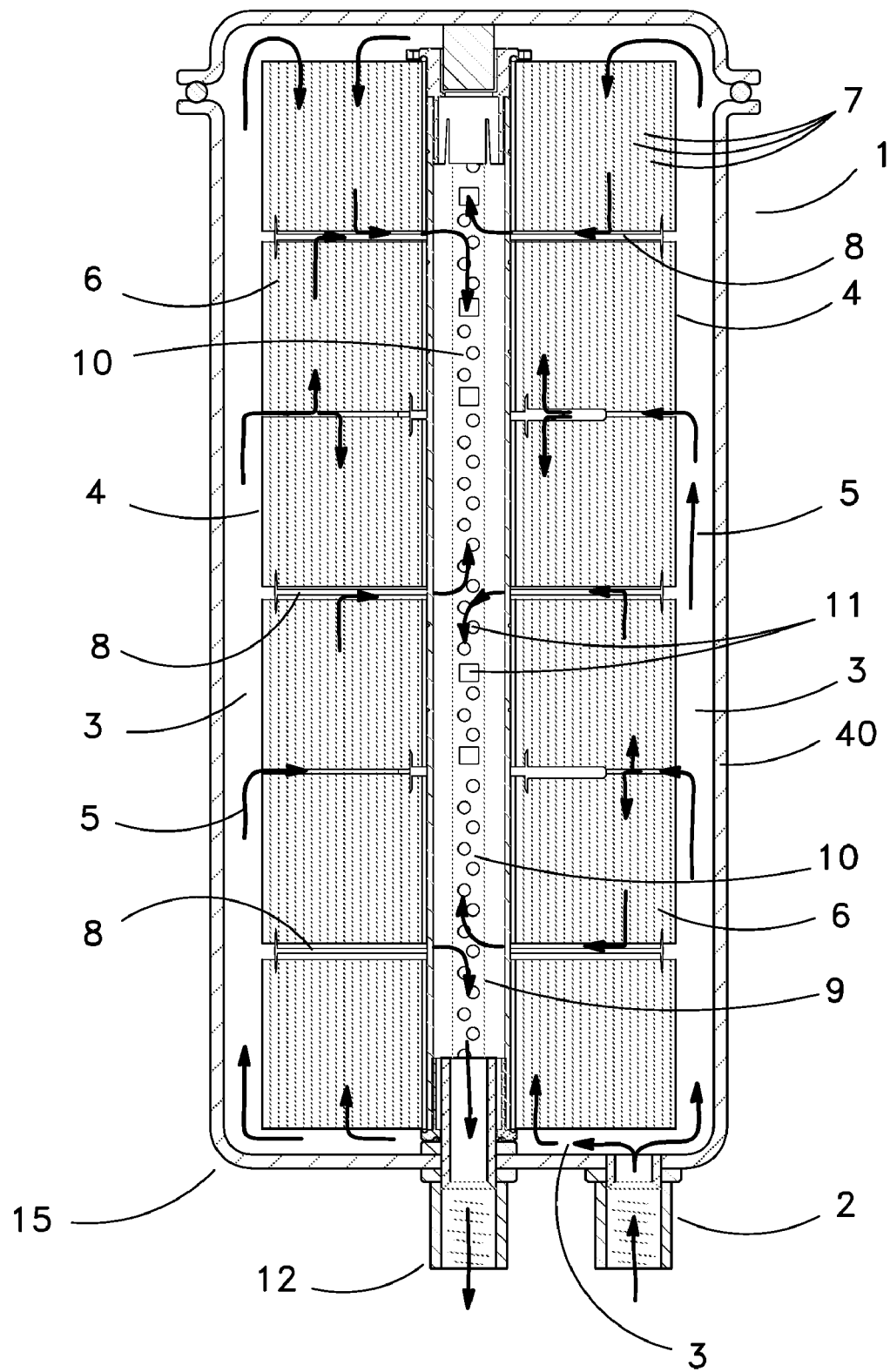
FIG. 3 shows possible fluid flow paths in a vertical cross-sectional view of a fluid filter apparatus having a filtered fluid conduit, filtered fluid collectors, unfiltered fluid seals, end caps, filter medium rolls, and a filter housing.

As there may be cut guides to facilitate the cutting of stock into different lengths, and as the cut made during manufacture is often made to yield a conduit that is longer than that shortest possible guided cut length, often the cut conduits will have visible conduit length cut guides, as shown in, e.g., FIG. 1 (the ones that guided the two cuts that generated the conduit from stock will typically not be visible). On conduits cut from stock, there may be end cap engager holes on one or both sides of the visible conduit length cut guides. As such "intermediately located" cut guides are not at the ends of the conduit, they will not be used to engage end caps. However, such holes still serve as passages for filtered fluid into the conduit interior for delivery out of the fluid filter. Indeed, such double usage possibility enables the efficient manufacture of stock to create different lengths of conduit onto which end caps may be snapped, where such conduit may enhance operative efficiency as compared with conventional conduits.

A handle 50 may be established at the top conduit end cap. In preferred embodiments, the handle (e.g., two half annular loops) is integrally molded with the top conduit end cap (i.e., the mold itself yields a handle and the end cap). Another feature that may be associated with one or both of the end caps is an o-ring seat 51 in which an o-ring 52 may be established to prevent insufficiently filtered fluid from leaking into a filtered fluid channel(s) 10 that leads to the conduit interior 18, and possibly to prevent the leakage of filtered fluid from such channel into a fluid flow path 5 directed by a filtered fluid collector. In a preferred embodiment, an o-ring 52 may be seated in an end cap on a side of part of the end cap that is towards the center of the filtered fluid conduit (i.e., a bottom side of part of the top end cap and a top side of part of the bottom end cap). The o-ring 52 may, after the conduit end caps are established at the conduit ends, establish an interference fit against a tube 22 that may be established in the afore-described sleeve-like manner around the filtered fluid conduit 9. Indeed, in particular embodiments such as those including snap on end caps, corresponding snap engagement parts may be positioned such that an interference fit is generated when the snap engagement is completed.

Particular embodiments of the inventive technology may be described relative to a particular feature—snap engagement of end caps with the filtered fluid conduit—that may afford advantages relative to convention designs, such as improvements in manufacturing efficiency and reduction in manufacturing costs. Indeed, a fluid filter apparatus may include a filtered fluid conduit having both a length that is at least three times a characteristic diameter 60, and a plurality of holes 11, and at least one end cap that snap engages the filtered fluid conduit via (through use of) a snap engager (which typically includes more than one component such as a prong and a hole). It is noted that the characteristic diameter 60 is defined as the diameter of a conceptual tube having a uniform circular cross-section and length equal to that of the actual filtered fluid conduit, where such conceptual tube has a volume that is equal to that volume of the actual filtered fluid conduit. For purposes here, conduit holes are ignored in the determination of conduit volume. As the reader may intuit, the term "characteristic diameter" is used because the cross-section shape of the actual tube is, in certain preferred embodiments, and even ignoring holes, not perfectly circular at all.

Holes 11 may be established along the at least one longitudinal portion of the filtered fluid conduit. The at least one longitudinal portion of the filtered fluid conduit may, during fluid filter operation, establish the afore-mentioned channel between the least one longitudinal portion and a filter medium roll(s) around the filtered fluid conduit. The longitudinal portion of the filtered fluid conduit may form such channel because of its cross-sectional shape (in a radial plane, which plane is orthogonal to a longitudinal axis of the filtered fluid conduit). In particular, such shape may be different from the remaining portion of the cross-sectional shape in that radial plane and create an areal space 120 (which would be a filtered fluid channel cross-section) between the conduit and the inner cross-sectional portion 70 of the filter medium roll around it. Such portion 70 may be tube 22 of the filter medium roll. In some embodiments, the cross-sectional shape at the longitudinal portion may be flat while the remainder may be circular arc. However, such flat shape is only one of many different possible shapes that, in conjuction with filter media around the conduit, would yield a filtered fluid channel 10 (see, e.g., FIGS. 4*a* and 4*b*).

A related fluid filter method may include the steps of manufacturing a filtered fluid conduit to have: a length that is at least three times a characteristic diameter 60, and a plurality of snap engager parts, and manufacturing at least one end cap, wherein at least one of the plurality of the snap engager parts enables snap engagement of the filtered fluid conduit with the at least one end cap. The method may further comprise the step of snap engaging the at least one end cap with the filtered fluid conduit.

Particular embodiments of the inventive technology may be described in terms that may relate more specifically to the shape of holes 11 of the filtered fluid conduit. In such embodiments, a fluid filter apparatus may comprise a filtered fluid conduit that has a length that is at least three times a characteristic diameter, and a plurality of holes 11, where at least one of the holes 71 has a first shape and engages an end cap during fluid filter operation, and wherein at least one other of the holes 72 has the first shape and passes filtered fluid from outside of the filtered fluid conduit 9 to inside of the filtered fluid conduit (the conduit interior 18) during fluid filter operation. The apparatus may further comprise at least one filter medium roll 4 established at least partially around the filtered fluid conduit 9. In particular embodiments, the aforementioned at least one of the holes snap engage the end cap(s). Further, particular embodiments may include at least one additional hole 75 that has a second shape that is different from the first shape and that passes filtered fluid from outside of the filtered fluid conduit 9 to inside of the filtered fluid conduit (the conduit interior 18) during fluid filter operation. In a particular embodiment, the first shape (of holes 71, 72) may be non-circular (e.g., square), and the second shape (of holes 75) may be circular. Holes of the second shape may be exclusively fluid conveyance holes 76; indeed, even if such holes 76 were located so as to be in a position to engage an elastic prong 31 of an end cap, they could not serve as snap engager holes because they do not correspond with (i.e., not shaped to accept in adequate snap fashion, as desired), and thus cannot engage, such prong. It is noted that a related method may be characterized as including the steps of: manufacturing a filtered fluid conduit to have a length that is at least three times a characteristic diameter, and a plurality of holes, wherein at least one of the holes 71 has a first shape and engages an end cap during fluid filter operation, and wherein at least one other of the holes 72 has the first shape and passes filtered fluid from outside of the filtered fluid conduit 9 to a conduit interior 18 during fluid filter operation. The method may further comprise the step of establishing the filtered fluid conduit 9 as part of a fluid filter (which step may involve manufacturing techniques that themselves involve sliding of filter medium rolls, filtered fluid collector(s) and possibly unfiltered fluid seal(s) onto the conduit 9, in addition to other steps described in this specification).

Other descriptions of certain aspects of the inventive technology that also relate to holes of the filtered fluid conduit may be as follows: a fluid filter apparatus that includes a filtered fluid conduit cut from a filtered fluid conduit stock molded to have: more than two snap engager parts (e.g., holes and/or prongs) able to engage an end cap, and a plurality of exclusively fluid conveyance holes 76. The snap engager parts (in a preferred embodiment, snap engager holes) and the plurality of exclusively fluid conveyance holes 76 may be situated along a channel 10 between the filtered fluid conduit and a filter medium roll. A related method may include the steps of molding a filtered fluid conduit stock 42 to have: more than two snap engager parts able (if appropriately situated at an end of a conduit once the stock is cut) to engage an end cap, and a plurality of exclusively fluid conveyance holes, cutting the filtered fluid conduit stock to create a filtered fluid conduit, and establishing the filtered fluid conduit as part of a fluid filter.

Particular inventive method embodiments may address the sequential functionalities of the filter and may include the steps of filtering fluid with a filter medium roll 4 to yield a filtered fluid, then delivering that filtered fluid towards a filtered fluid conduit 9 through use of a filtered fluid collector 8 established substantially orthogonal to the filtered fluid conduit 9, then channeling the filtered fluid along a filtered fluid channel 10 that is located between the filtered fluid conduit 9 and filter medium roll(s) 4, and in a direction that is parallel a longitudinal axis of the filtered fluid conduit and away from the filtered fluid collector 8, and then passing the filtered fluid through at least one hole of the filtered fluid conduit 9 to inside of the filtered fluid conduit. The step of passing the filtered fluid through at least one hole of the filtered fluid conduit to inside of the filtered fluid conduit may comprise the step of passing the filtered fluid through at least one hole located from ⅓ to ½ the distance from the filtered fluid collector to a nearest, different filtered fluid collector 8.

Particular embodiments of the inventive technology may relate specifically to an unfiltered fluid seal 80 that may be used in the filter. Such fluid filter apparatus may include an inner annulus 81 sized for establishment around a filtered fluid conduit during operation of a fluid filter, and a sealing wall 82 that is established around the inner annulus 81 and that, during operation of the fluid filter, prevents radial flow of unfiltered fluid from between an upper filter medium roll 85 (established at least partly above the sealing wall during operation of the fluid filter) and a lower filter medium roll 86 (established at least partly below the sealing wall during operation of the fluid filter) towards a filtered fluid conduit, and directs the unfiltered fluid through at least one of the upper filter medium roll 85 and lower filter medium roll 86. It is of note that the term "annulus sized for establishment around a filtered fluid conduit" includes the designs where the inner annulus is established directly against a tube of the filter medium roll(s) 4. Such apparatus may further comprise at least one structural separator 87 established extra-radially of (outside of) the sealing wall 82. In at least one embodiment, the at least one structural separator may include at least three spokes 88. The separators 87, whatever their configuration, may prevent direct compression of filter medium rolls 85, 86 against each other, and thereby preclude problems associated with such direct compression (e.g., channeling, flow obstruction, compromise of filter efficiency). It is of note that the seal, although different from and patentable relative to the seal disclosed in U.S. Pat. No. 4,792,397, may interface the filter medium and be situated as disclosed in such patent, such patent hereby incorporated herein.

A method related to the unfiltered fluid seal may comprise the steps of establishing a sealing wall 82 around an inner annulus 81 that itself is sized for establishment around a filtered fluid conduit 9, preventing, during operation of a fluid filter, radial flow of unfiltered fluid from between an upper filter medium roll 85 and a lower filter medium roll 86 towards a filtered fluid conduit 9, directing the unfiltered fluid through at least one of the upper filter medium roll 85 and the lower filter medium roll 86, and separating the upper filter medium roll 85 and the lower filter medium roll 86 with at least one structural separator 88 established extra-radially of and emanating from the sealing wall 82. In particular embodiments, the step of separating the upper filter medium roll and the lower filter medium roll may be accomplished with at least three spokes 88.

Particular embodiments may relate specifically to the filtered fluid collector 8. Indeed, aspects of the inventive technology may relate to a filtered fluid collector that includes filtered fluid flow guides 91 in the form of collector spokes 92 established between a central annulus 93 sized for establishment around the filtered fluid conduit (a description that includes the case where it is established directly against a tube of a filter medium roll), and an outer wall having a height (dimension measured parallel with longitudinal axis of the filtered fluid conduit around which the filtered fluid collector is established during filter operation) that is sufficient to block the flow of unfiltered fluid to inside of said outer wall and the flow of filtered fluid to outside of said outer wall.

Manufacture and use/application of the inventive technology would be clear to one of ordinary skill in the art upon reading this description. Manufacturing techniques—particularly useful in manufacture of conduit stock—include but are not limited to injection molding; indeed, a mold that includes holes (and therefore does not require drilling of holes after injection) avoids labor intensive drilling operations. Any part (e.g., the filtered fluid conduit, or the end caps) may be injection molded and therefore descriptively characterized as such (e.g., an injection molded filtered fluid conduit, or injection molded end caps).

As can be easily understood from the foregoing, the basic concepts of the present invention may be embodied in a variety of ways. It involves both filtration techniques as well as devices to accomplish the appropriate filtration. In this application, the filtration techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "filter" should be understood to encompass disclosure of the act of "filtering"—whether explicitly discussed or not—and, conversely, were there effectively disclosure of the act of "filtering", such a disclosure should be understood to encompass disclosure of a "filter" and even a "means for filtering" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the filtration devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A fluid filter apparatus comprising:
   a filtered fluid conduit defining a conduit longitudinal axis, a conduit interior, and a first filtered fluid channel inside of said filtered fluid conduit, said filtered fluid conduit having a first conduit end and a second conduit end;
   a first filter medium roll established around said filtered fluid conduit towards said first conduit end, said first filter medium roll having:
      a first filter medium roll tube;
      filter medium around said first filter medium roll tube; and
      a first filter medium roll outer end and a first filter medium roll inner end, said first filter medium roll outer end closer to said first conduit end than is said first filter medium roll inner end;
   a second filter medium roll established around said filtered fluid conduit closer to said second conduit end than is said first filter medium roll, said second filter medium roll having:
      a second filter medium roll tube;
      filter medium around said second filter medium roll tube; and
      a first end and a second end, said first end closer to said first filter medium roll than is said second end;
   a filtered fluid collector established around said filtered fluid conduit and between said first filter medium roll and said second filter medium roll so as to collect fluid filtered by said first filter medium roll and said second filter medium roll; and
   at least one second filtered fluid channel outside of said filtered fluid conduit, and defined by said filtered fluid conduit and said filter medium roll tubes, each of said at least one second filtered fluid channel comprising:
      an inner channel wall formed by a longitudinal conduit channel portion of said filtered fluid conduit;
      an outer channel wall formed by a longitudinal tubular portion of said filter medium roll tubes; and
      an areal space, between said inner channel wall and said outer channel wall, through which channeled filtered fluid flows during operation of said fluid filter apparatus,
   wherein said filtered fluid conduit has at least one remaining longitudinal conduit portion that is distinct from said longitudinal conduit channel portion and that does not form said inner channel wall, said at least one remaining longitudinal conduit portion defining, in a radial plane that is perpendicular to said conduit longitudinal axis, a conduit center, and having, in said radial plane, an outer radius,
   wherein said longitudinal conduit channel portion forming said inner channel wall has, in said radial plane, a cross-sectional profile with an outer edge that is furthest from said conduit center, all points of said outer edge having a distance from said conduit center that is less than said outer radius, thereby forming one of said at least one second filtered fluid channel when said filter medium roll tubes are established around said filtered fluid conduit,
   wherein said channeled filtered fluid, while flowing through said at least one second filtered fluid channel, travels externally of said filtered fluid conduit, and in a channeled fluid direction that is away from the filtered fluid collector that collected it and parallel with said conduit longitudinal axis,
   said apparatus further comprising a plurality of holes through said filtered fluid conduit along said inner channel wall, said holes allowing said channeled filtered fluid to enter into said conduit interior after said filtered fluid, while outside of said filtered fluid conduit, flows through said at least one second filtered fluid channel in said channeled fluid direction.

2. A fluid filter apparatus as described in claim 1 further comprising a first conduit end cap at said first conduit end and a second conduit end cap at said second conduit end.

3. A fluid filter apparatus as described in claim 2 further comprising o-rings, at least one of which is established against said first conduit end cap and at least one other of which is established against said second conduit end cap.

4. A fluid filter apparatus as described in claim 2 further comprising a handle of least on at least one of said conduit end caps.

5. A fluid filter apparatus as described in claim 2 wherein said first conduit end cap and said second conduit end cap each snap engage said filtered fluid conduit.

6. A fluid filter apparatus as described in claim 2 further comprising at least one hole at said first conduit end that engages said first conduit end cap and at least one different hole at said second conduit end that engages said second conduit end cap.

7. A fluid filter apparatus as described in claim 6 wherein said at least one hole and said at least one different hole that engage said end caps have a first shape and wherein said majority of said plurality of holes through said filtered fluid conduit are exclusively fluid conveyance holes having a second, different shape.

8. A fluid filter apparatus as described in claim 6 wherein at least two of said plurality of holes pass filtered fluid during filter operation, and wherein at least one of said at least two of said plurality of holes has said first shape.

9. A fluid filter apparatus as described in claim 1 further comprising a housing established around said first filter medium roll and said second filter medium roll.

10. A fluid filter apparatus as described in claim 1 wherein said filtered fluid conduit is cut from a filtered fluid conduit stock.

11. A fluid filter apparatus as described in claim 10 wherein said filtered fluid conduit is cut from said filtered fluid conduit stock along conduit length cut guides.

12. A fluid filter apparatus as described in claim 1 wherein said filtered fluid collector comprises filtered fluid flow guides.

13. A fluid filter apparatus as described in claim 12 wherein said filtered fluid flow guides are collector spokes.

14. A fluid filter apparatus as described in claim 12 wherein said filtered fluid collector comprises a central annulus and a collector outer wall, and wherein said filtered fluid flow guides are established between said central annulus and said collector outer wall.

15. A fluid filter apparatus as described in claim 1 wherein said filtered fluid conduit is an injection molded filtered fluid conduit.

16. A fluid filter apparatus as described in claim 1 wherein said cross-sectional profile in said radial plane of said longitudinal conduit channel portion is flat.

17. A fluid filter apparatus as described in claim 1 wherein said cross-sectional profile in said radial plane of said longitudinal conduit channel portion is curved.

18. A fluid filter apparatus as described in claim 1 wherein said filter medium roll tubes comprise at least one remaining longitudinal tubular portion that is distinct from said longitudinal tubular portion that forms said outer channel wall.

19. A fluid filter apparatus as described in claim 18 wherein each of said at least one remaining longitudinal tubular portion directly contacts one of said at least one remaining longitudinal conduit portion.

20. A fluid filter apparatus as described in claim 1 wherein said longitudinal conduit channel portion extends substantially from said first conduit end to said second conduit end.

21. A fluid filter apparatus as described in claim 1 wherein said at least one filtered fluid channel comprises two filtered fluid channels.

22. A fluid filter apparatus as described in claim 1 further comprising a third filter medium roll and a fourth filter medium roll, said third filter medium roll having a third filter medium roll tube, filter medium around said third filter medium roll tube, and two third filter medium roll ends, said fourth filter medium roll having a fourth filter medium roll tube, filter medium around said fourth filter medium roll tube, and two fourth filter medium roll ends, said third and said fourth filter medium rolls established around said filtered fluid conduit so that said third filter medium roll is closer to said second filter medium roll than is said fourth filter medium roll.

23. A fluid filter apparatus as described in claim 22 wherein said filter medium rolls are stacked on said filtered fluid conduit, each pair of proximate stacked filter medium rolls separated by a device selected from the group consisting of: a filtered fluid collector and an unfiltered fluid seal.

24. A fluid filter apparatus as described in claim 22 further comprising an unfiltered fluid seal established around said filtered fluid conduit between said second filter medium roll and said third filter medium roll, said unfiltered fluid seal comprising a sealing wall that extends partially into said second filter medium roll and partially into said third filter medium roll.

25. A fluid filter apparatus as described in claim 24 further comprising a second filtered fluid collector established around said filtered fluid conduit and between said third filter medium roll and said fourth filter medium roll.

26. A fluid filter apparatus as described in claim 24 wherein said unfiltered fluid seal further comprises an inner annulus established intra-radially of said sealing wall and between said second medium roll and said third filter medium roll.

27. A fluid filter apparatus as described in claim 24 further comprising at least two additional filter medium rolls, at least one additional filtered fluid collector and at least one additional unfiltered fluid seal, each said at least one additional filtered fluid collector and said at least one additional unfiltered fluid seal established directly between two proximate filter medium rolls of said at least two additional filter medium rolls in alternating fashion such that a device selected from the group consisting of: one of said filter fluid collectors and one of said unfiltered fluid seals, is established directly between said two proximate filter medium rolls.

28. A fluid filter apparatus as described in claim 24 wherein said unfiltered fluid seal further comprises at least one structural separator established extra-radially of said sealing wall and between said second filter medium roll and said third filter medium roll.

29. A fluid filter apparatus as described in claim 28 wherein said at least one structural separator comprises at least three spokes.

* * * * *